United States Patent
Stall et al.

(10) Patent No.: US 10,650,541 B2
(45) Date of Patent: May 12, 2020

(54) PRESENTING APPLICATIONS WITHIN VIRTUAL ENVIRONMENTS

(71) Applicant: Microsoft Technology Licensing, LLC, Redmond, WA (US)

(72) Inventors: Jeffrey Evan Stall, Kirkland, WA (US); Christopher Nathaniel Raubacher, Redmond, WA (US); Luciano Baretta Mandryk, Issaquah, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/976,038

(22) Filed: May 10, 2018

(65) Prior Publication Data
US 2018/0330515 A1 Nov. 15, 2018

Related U.S. Application Data

(60) Provisional application No. 62/504,529, filed on May 10, 2017.

(51) Int. Cl.
*G06T 7/536* (2017.01)
*G06T 7/70* (2017.01)
(Continued)

(52) U.S. Cl.
CPC .............. *G06T 7/536* (2017.01); *G06F 3/011* (2013.01); *G06F 3/012* (2013.01);
(Continued)

(58) Field of Classification Search
CPC ... G06T 7/536; G06T 7/11; G06T 7/70; G06T 15/00; G06T 15/205; G06T 19/003;
(Continued)

(56) References Cited

U.S. PATENT DOCUMENTS

| 5,523,886 A | 6/1996 | Johnson et al. |
| 6,271,808 B1 | 8/2001 | Corbin |

(Continued)

FOREIGN PATENT DOCUMENTS

WO 0176260 A1 10/2001

OTHER PUBLICATIONS

"International Search Report/Written Opinion Issued in PCT Application No. PCT/US18/032002", dated Jul. 27, 2018, 16 Pages.

(Continued)

*Primary Examiner* — Phuc N Doan
(74) *Attorney, Agent, or Firm* — Workman Nydegger

(57) ABSTRACT

Virtual environments may be presented to a user with an inclusion of one or more applications, but many such techniques for integrating the applications with the virtual environment may exhibit disadvantages. For example, a two-dimensional "flat" rendering of the application may require a loss of visual depth, and/or may appear inconsistent; an immersive presentation that is mutually exclusive with the presentation of the virtual environment may achieve very limited integration; and a holographic presentation may appear incongruous. Such techniques may also increase presentation latency, with noticeable and significant consequences. Instead, the virtual environment may define an application region, and may notify the application of the application region and a perspective of the user within the virtual environment. The application may present an application view that reflects the perspective of the user, and the virtual environment may present the application view within the application region of the virtual environment.

20 Claims, 10 Drawing Sheets

(51) Int. Cl.

| | |
|---|---|
| *G06T 15/20* | (2011.01) |
| *G06T 19/00* | (2011.01) |
| *G06T 7/11* | (2017.01) |
| *G06F 3/01* | (2006.01) |
| *G06F 3/0481* | (2013.01) |
| *G06T 15/00* | (2011.01) |
| *H04N 13/117* | (2018.01) |
| *H04N 13/344* | (2018.01) |
| *H04N 13/366* | (2018.01) |

(52) U.S. Cl.
CPC ............ *G06F 3/04815* (2013.01); *G06T 7/11* (2017.01); *G06T 7/70* (2017.01); *G06T 15/00* (2013.01); *G06T 15/205* (2013.01); *G06T 19/003* (2013.01); *H04N 13/117* (2018.05); *H04N 13/344* (2018.05); *H04N 13/366* (2018.05)

(58) Field of Classification Search
CPC .. H04N 13/117; H04N 13/344; H04N 13/366; G06F 3/011; G06F 3/012; G06F 3/04815
See application file for complete search history.

(56) References Cited

U.S. PATENT DOCUMENTS

| | | | |
|---|---|---|---|
| 8,004,558 B2 | 8/2011 | Sedwick et al. | |
| 8,834,168 B2 | 9/2014 | Wallace et al. | |
| 9,167,289 B2* | 10/2015 | Stinson, III | H04N 21/4223 |
| 9,317,175 B1* | 4/2016 | Lockhart | G06F 3/04815 |
| 9,342,467 B1* | 5/2016 | McGrath | G09G 3/003 |
| 9,396,588 B1 | 7/2016 | Li | |
| 2008/0309660 A1* | 12/2008 | Bertolami | A63F 13/10 |
| | | | 345/419 |
| 2009/0051699 A1* | 2/2009 | Posa | H04N 21/42202 |
| | | | 345/619 |
| 2011/0115883 A1* | 5/2011 | Kellerman | G06F 3/012 |
| | | | 348/46 |
| 2011/0249094 A1 | 10/2011 | Wang et al. | |
| 2012/0060177 A1* | 3/2012 | Stinson, III | H04N 21/4223 |
| | | | 725/12 |
| 2013/0194259 A1* | 8/2013 | Bennett | G06T 19/006 |
| | | | 345/420 |
| 2014/0002444 A1 | 1/2014 | Bennett et al. | |
| 2014/0118509 A1* | 5/2014 | Kroon | H04N 13/117 |
| | | | 348/51 |
| 2014/0204002 A1* | 7/2014 | Bennet | G06F 3/011 |
| | | | 345/8 |
| 2014/0375663 A1 | 12/2014 | Pfaffe | |
| 2015/0145887 A1 | 5/2015 | Forutanpour et al. | |
| 2015/0358539 A1 | 12/2015 | Catt | |
| 2015/0363976 A1 | 12/2015 | Henson | |
| 2016/0026253 A1* | 1/2016 | Bradski | G02B 27/225 |
| | | | 345/8 |
| 2016/0210784 A1 | 7/2016 | Ramsby et al. | |
| 2016/0240009 A1* | 8/2016 | Lyren | H04R 1/00 |
| 2016/0370970 A1 | 12/2016 | Chu et al. | |
| 2017/0115488 A1* | 4/2017 | Ambrus | G02B 27/0172 |

OTHER PUBLICATIONS

Godin, Guy "Virtual Desktop 1.0 Trailer", Retrieved from: https://www.youtube.com/watch?v=bjE6qXd6ltw, Mar. 28, 2014, 1 Page.

"Embedding 2D Desktops into VR" Retrieved from: https://www.youtube.com/watch?v=RzfOex-r4Ug, Mar. 28, 2014, 1 Page.

"Rendering to the Oculus Rift" Retrieved from: https://web.archive.org/web/20160818065409/https://developer3.oculus.com/documentation/pcsdk/latest/concepts/dg-render/, Aug. 18, 2016, 24 Pages.

"The Valve/Oculus Layered Compositors" Retrieved from: https://metaversing.com/2015/04/29/the-layered-compositor-magic-glue-for-vr/, Apr. 29, 2015, 5 Pages.

Kanbara et al., "A Stereoscopic Video see-through Augmented Reality System based on Real-Time vision-based Registration" In Proceedings of IEEE Virtual Reality, Mar. 18, 2000, 8 pages.

Ainsworth et al., Acquisition of Stereo Panoramas for Display in VR Environments, In Proceedings of SPIE-IS&T Electronic Imaging, vol. 7864, 2011, 15 Pages.

* cited by examiner

PRESENTING APPLICATIONS WITHIN VIRTUAL ENVIRONMENTS

CROSS-REFERENCE TO RELATED APPLICATIONS

This application claims priority under 35 U.S.C. §§ 119-120 to, U.S. Patent Application No. 62/504,529, entitled "PRESENTING APPLICATIONS WITHIN VIRTUAL ENVIRONMENTS," filed on May 10, 2017, the entirety of which is hereby incorporated by reference as if fully rewritten herein.

BACKGROUND

Within the field of user interfaces, many scenarios involve a presentation of a virtual environment. For example, a device may feature a headset that displays a simulated three-dimensional environment to a user via stereoscopic displays, where coordinated output of the displays enables a binocular display with the simulation of depth. Such environments may be presented in isolation of the physical environment of the user (e.g., completely blocking the user's view of the physical environment and supplanting it with a view of the virtual environment), or may incorporate aspects of the physical environment of the user (e.g., an augmented reality headset, such as a pair of glasses or goggles, may overlay visual output over particular objects in the physical environment; and/or a "video pass-through" device may capture an image of the physical environment and annotate it with additional content while displaying it to the user).

Within such virtual environments, it may be desirable to present the graphical user interfaces of one or more applications, and several techniques exist to combine an application environment of an application with the virtual environment. As a first such example, the virtual environment may receive a flat, two-dimensional view of the application environment that may be displayed within the virtual environment in the manner of a two-dimensional painting or window. As a second such example, the virtual environment may allow the user to request a transition to an immersive application environment, wherein the three-dimensional application environment supplants the virtual environment. That is, the user may request to transition from an exclusive view of the virtual environment to an exclusive view of the application environment. As a third such example, the virtual environment may permit a holographic view, in which a set of application models from the application are integrated with the objects of the virtual environment. For example, the application environment may present a set of objects comprising a scene, and the virtual environment may receive metadata descriptors of all such objects and may insert them into the virtual environment.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Although variations exist in the techniques for integrating a presentation of an application environment within a virtual environment, many such variations exhibit significant limitations that may render the device and/or rendering pipeline unsuitable for other scenarios, and/or may limit the applicability of the scenario for which the technique is presented.

As a first such example, a flat view may discard depth information that may be helpful for the user, such as where the application environment ordinary presents a depth-based, three-dimensional view. Additionally, a two-dimensional image may appear awkward or inconsistent when presented within an otherwise three-dimensional virtual environment.

As a second such example, while an immersive mode may be desirable in some circumstances (e.g., where the user intends to interact exclusively with the application environment for a period of time), it may be incompatible with other scenarios (e.g., where the user wishes to interact concurrently with the virtual environment and the application environment, and/or with two or more application environments).

As a third such example, a holographic view may be unsuitable in many circumstances where the virtual environment utilizes a different rendering process than the application environment; e.g., the application environment may utilize a particular selection of lighting models, shaders, geometry, and/or textures, including the platforms that implement them; however, the device upon which the holographic view is executing may provide no such support for secret or proprietary techniques. Additionally, the presentation of application models within the virtual environment may seem incongruous and/or inconsistent, e.g., where the application models seem out of place when inserted amidst the virtual environment without any visual boundary therebetween.

The present disclosure provides techniques for presenting an application within a virtual environment. In accordance with such techniques, the virtual environment may define an application region within the virtual environment, and identify a perspective of the user within the virtual environment. The virtual environment may notify the application of the application region and the perspective of the user within the virtual environment, which may enable the application to generate an application view of the application from the perspective of the user. The virtual environment may receive the application view of the application from the perspective of the user, insert the application view of the application into the application region of the virtual environment, and present the virtual environment including the application region to the user.

These techniques may enable the virtual environment to include the graphical user interfaces of one or more applications in a manner that is well-integrated with the virtual environment, e.g., by enabling the application view of the application to reflect the same perspective of the user as the remainder of the virtual environment, including changing as the perspective changes. Additionally, these techniques may promote the performance of the virtual environment, e.g., by parallelizing the processing workload of the rendering of the virtual environment and the application view. Users may be very sensitive to latency in the presentation of the virtual environment, and may experience nausea and fatigue if visual are presented at an inconsistent rate, out of sync, and/or in a manner that is not promptly responsive to the user's movements, such as turning the head or taking a step. The allocation of the processing workload between the virtual environment and the application may promote a desirably low and consistent latency in the presentation of the virtual environment and the application as a significant advance in the field of virtual environments.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
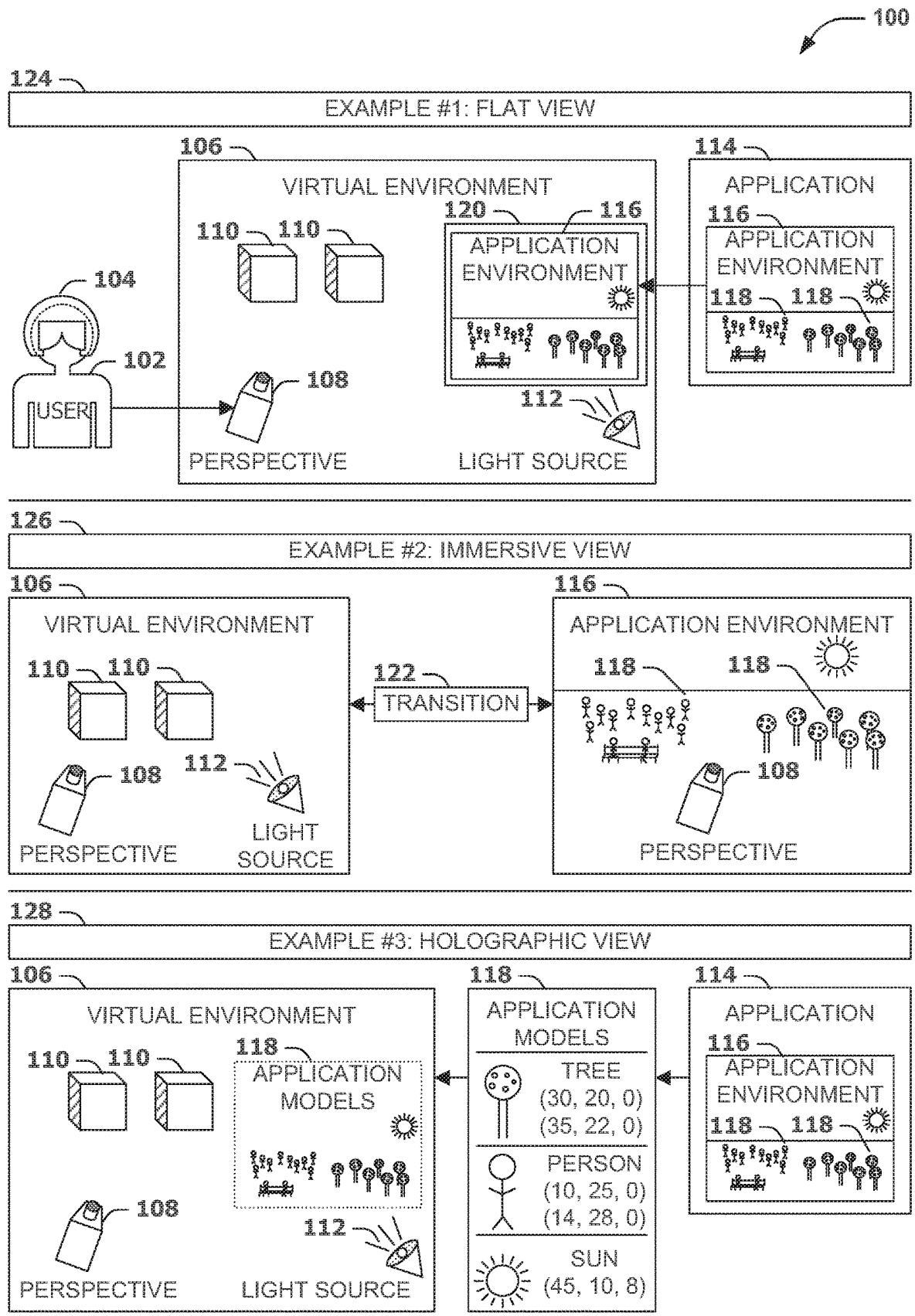
FIG. 1 is an illustration of an example scenario featuring various techniques for presenting an application within a virtual environment.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A. Introduction

Current virtual composition systems present a virtual environment within which a set of applications may be presented, and the integration of the visual output of the applications may be integrated with the virtual environment in several ways that present distinctive appearances and visual behavior. As a first example, "flat" applications may be displayed, e.g., as a rectangular area within the virtual environment, optionally adorned with chrome elements. The presented application content is two-dimensional, and does not present a perceivable visual depth component, particularly when viewed in a stereoscopic manner. As a second example, "immersive" applications take exclusive control of the virtual environment in order to present rich content with visual depth. However, the immersive application completely replaces the content of the virtual environment. As a third example, applications may present "holograms" as three-dimensional models that may be positioned within the virtual environment. That is, the content of the virtual environment, a first set of models presented by a first application, and a second set of models presented by a second application may be arranged together to form a scene as a collection of models and content.

FIG. 1 is an illustration of a set 100 of example scenarios that illustrate such techniques through the presentation, to a user 102, of a graphical user interface of an application 114 within a virtual environment 106. In this set 100 of example scenarios, the user 102 wears a headset 104 that presents a virtual environment 106 from a particular perspective 108 of the user 102. The headset 104 may comprise a helmet that visually isolates the user 102 from the physical environment, such as a traditional virtual reality presentation that is disconnected from the physical environment. Alternatively, the headset 104 may integrate the presentation of the virtual environment 106 with the physical environment of the user 104, such as glasses or goggles that present an augmented reality interface in which the visual output of the device appears to overlay a view of the physical environment of the user 102 that is visible through a semi-transparent display surface of the headset 104, or a "video see-through" mode in which the headset 104 captures an image of the physical environment of the user 102 and annotates it with additional content before presenting it to the user 102. The virtual environment 106 may also present a set of virtual objects 110 to the user 102, such as text, images, videos, and two- and three-dimensional rendered models that are positioned and oriented at particular locations within the virtual environment 106. The virtual environment 106 may also provide a dynamic perspective 108 of the user 102, wherein the user 102 is permitted to alter the perspective 108 through actions such as turning, tilting, and/or craning the head; adjusting the user's gaze; altering a body posture such as by leaning, twisting, stooping, or stretching; and moving the location of the perspective 108 by walking, turning in place, leaning, crouching, or jumping. The user 102 may also change the perspective 108 through other sources of user input, such as handheld controllers featuring a joystick and/or buttons that enable the user to alter the location and/or orientation of the perspective 108. The headset 104 may receive and/or detect such changes in the dynamic perspective 108 (e.g., via an inertial measurement unit (IMU); a head-tracking device such as sensors that compare the location and/or orientation of the helmet with the physical environment; and/or image analysis of an image of the user 102), and may correspondingly adjust the perspective 108 of the user 102 within the virtual environment 106, such as by presenting the virtual objects 110 at different locations and/or orientations with respect to the dynamic perspective 108 of the user 102. The virtual environment 106 may also demonstrate such changes by updating the rendering of other portions of the virtual environment 106, such as the light and shadows cast by a light source 112 upon the virtual objects 110 of the virtual environment 106 (e.g., depicting the shading of various surfaces of the virtual objects 110 based upon the relative locations and/or orientations of the perspective 108 of the user 102 and one or more light sources 112 within the virtual environment 106).

In some such headsets 104, the virtual environment 106 is presented with binocular displays—e.g., a left display positioned in front of a left eye of the user 102, and a right display positioned in front of a right eye of the user 102, that present the same virtual environment 106 when viewed from slightly different perspectives 108, reflecting the slightly shifted views of the user's physical environment through each eye. The slight shift may be apparent to the user 102 in the form of a simulated depth of the presentation of the virtual environment 106, where some virtual objects 110 appear closer to the user 102 than others due to a greater relative displacement of nearby virtual objects 110 than more distant virtual objects 110. The presentation of binocular visuals may promote the visual reflection of changes in the perspective 108 of the user 102, e.g., by exhibiting greater parallax movement of closer virtual objects 110 than of more distant virtual objects 110 in response to a lateral translation of the perspective 108 of the user 102. Such binocular presentation may promote the resulting vividness and realism of the virtual environment 106 to the user 104; may provide significant depth information to the user 104 that is received and interpreted in natural and intuitive ways, such as depicting the relative distance and/or dimensions of various virtual objects 110; and/or may reduce some undesirable physical consequences of viewing the virtual environment 106, such as dizziness, nausea, headaches, eyestrain, and/or fatigue that may arise from a dissonant and/or inconsistent visual presentation of the virtual environment 106 to the user 102.

In such scenarios, it may be desirable to include the presentation of an application 114 featuring an application environment 116. For example, the virtual environment 106 may host a productivity application 114 featuring a graphical user interface; a two-dimensional, 2.5-dimensional, and/or three-dimensional game featuring a set of application models 118; or a media presentation, such as a two- or three-dimensional video. The application 114 may be capable of rendering an application view of the application environment 116, and the virtual environment 106 may seek to integrate the application view with the virtual objects 110, light sources 112, and other features of the virtual environment 106. Many such techniques are available for this integrated presentation, with various results.

As a first example 124, the virtual environment 106 may insert a "flat" application view of the application environment 116. In this first example 124, the application 114 comprises a three-dimensional application environment, such as a three-dimensional rendering of a scene, that is to be integrated with the virtual environment 106. To this end, the virtual environment may ask the application 114 to present a two-dimensional rendering or snapshot of the application environment 116, such as a portrait. Alternatively, the virtual environment 106 may receive a three-dimensional rendering of the application environment 116 from the application 114, and may then flatten it into a two-dimensional view. The virtual environment 106 may then define a two-dimensional application frame 120 for the application environment 116, such as a picture frame in which the flat, two-dimensional view of the application environment 116 is presented.

Although comparatively easy to implement, this first example 124 exhibits some significant disadvantages. As a first such example, the flattening of the application environment 116 may present a loss of visual detail in the depth of the scene; e.g., even if the headset 104 provides binocular displays, the application models 118 of the application environment 116 remain flat and two-dimensional with no appearance of depth. Additionally, the content of the application environment 116 is dissociated with the perspective of the user 108. While the two-dimensional application frame 120 may exhibit geometric changes (such as scaling and skewing to portray the relationship between the perspective 108 of the user 102 and the location of the application frame 120), and similar image translation techniques may be applied to the two-dimensional view of the application environment 116. However, the actual content of the application environment 116 does not change based on the perspective 108 of the user 102; e.g., as the perspective 108 shifts, the application models 118 in the flattened two-dimensional presentation exhibit no relative parallax shift. The resulting presentation resembles the experience of walking around a two-dimensional painting hanging on a wall, rather than a natural, depth-reflective integration of the application models 118 with the virtual environment 106.

As a second example 126, the application environment 116 may be presented as an immersive view that is mutually exclusive with the virtual environment 106. For example, the user 104 may view the virtual objects 110 within the virtual environment 106 from varying perspectives 108, and may request a transition 122 into the application environment 116. In response, the headset 104 may present a complete transition 122 from the virtual environment 106 to the application environment 116, where the virtual objects 110 are supplanted by the application models 118 of the application environment 118. The user 102 may interact with the application environment 116 in a similar manner as the virtual environment 106, e.g., altering the perspective 108 within the application environment by turning or tipping the head, crouching or jumping or leaning, or walking in various directions. The headset 104 may depict a corresponding translation of the position and/or orientation of the perspective 108 within the application environment 116, such as by translating the locations and/or orientations of the application models 118. When the user 104 wishes to return to the virtual environment 106, the headset 104 may present another complete transition 122 back to the virtual environment 106 in which the application environment 116 is no longer visible. For example, the user 102 may use the virtual environment 106 to launch a three-dimensional game, which is presented to the user 102 through the headset 104 exclusive of the virtual environment 106. When the game is completed, the headset 104 may terminate the game, including the view of the application environment 116 of the game, and return the user 102 to the virtual environment 106.

Again, while comparatively easy to implement, this second example 126 also presents some disadvantages, as this second example 126 represents a failure and/or refusal to integrate significant portions of the application environment 116 with the virtual environment 106. The mutual exclusivity of the application environment 116 and the virtual environment 106 provide a significant limitation of the integration of these environments; e.g., the user 102 may be unable to view the application models 118 of the application environment 116 concurrently with the virtual objects 110 of the virtual environment 106. Accordingly, the user 102 may have to transition 122 between the virtual environment 106 and the application environment 116 frequently and/or rapidly in order to interact with the contents of both environments. Such presentation may exhibit further disadvantages if the user 102 wishes to interact with multiple applications 114 concurrently; i.e., the device 104 may be capable of presenting only one environment at a time, and may therefore require the user 102 to switch between several applications 114 and the virtual environment 106 very rapidly or frequently, thus presenting a comparatively heavy, cumbersome, and slow user experience.

As a third example 128, the headset 124 may present a holographic view of the application environment 116 of the application 114, wherein the application models 118 are exported from the application environment 116 into the virtual environment 106. The export may include, e.g., the names and depictions of various two- and three-dimensional models comprising the application environment 116, and the locations and/or orientations of instances thereof. The virtual environment 106 receives the application models 118 and adds them to the set of virtual objects 110 of the virtual environment, including rendering the application models 118 and the virtual objects 110 using the same rendering process and visual effects, such as the light sources 112 present within the virtual environment 106.

This third example 128 also exhibits a number of disadvantages. As a first such example, the presentation of the application models 118 alongside the virtual objects 110 may be visually incongruous; e.g., the visual style and/or content may yield an inconsistent and perhaps unpleasant experience. For instance, the applications 110 may comprise text messages or documents, while the application objects 118 may comprise animated characters in a game; the application of the same rendering process may result in a dissonant presentation, such as depicting the text messages or documents in a cartoonish rendering style, and/or presenting the application models 118 with the visual appearance of ordinary text-based elements that detract from the entertainment. Such dissonance may be exacerbated if the application models 118 are not visually bounded with respect to the virtual objects 110; e.g., the application models 118 may commingle with and/or overlap the application objects 110, leading to a jumbled visual result. As another example, the application models 118 of the application environment 116 may exhibit a different scale than the virtual objects 110 of the virtual environment 106; e.g., fairly small and detailed application models 118 may appear alongside comparatively gigantic documents and text, thus creating a highly inconsistent user experience. Moreover, in some scenarios, the integrated presentation may be incompatible and/or unachievable; e.g., the application 114 may utilize a lighting model, shading model, and/or rendering technique that is not supported by the virtual environment 106, thus preventing the virtual environment 106 from accurately depicting the application models 118. Again, such problems may be exacerbated if multiple applications 114 are to be integrated with the virtual environment 106, wherein the resulting presentation of the virtual environment 106 exhibits a multitude of inconsistent visual styles, content, and rendering techniques that are commingled without clear boundaries.

Another significant problem that may arise in these and other techniques for integrating the application 114 and the virtual environment 106 involves the performance thereof. Users 102 of headsets 104 may be particularly sensitive to latency, in the form of delays and/or inconsistencies between the user's movements and the visual presentation of the virtual environment 106 and/or the application environment 116. For example, when the user 102 turns his or her head, even corresponding minor delays in the visual responsiveness of the virtual environment 106 and/or the application 114 to this change of perspective 108 may be highly noticeable to the user 102. In some circumstances. The user 102 may perceive such delays as a sluggishness between the user's movement and the view through the headset 104; as a framerate hitch or hiccup, such as a momentary freeze of the visual presentation; as shearing, such as a moment where a first half of a view of the virtual environment 106 is updated and the second half is not; and/or as a desynchronization of the virtual environment 106 and the application 114, such as a moment in which the virtual environment 106 promptly responds to the shift in perspective 108 while the application 114 remains static. Users 102 may be highly sensitive to such visual artifacts, and may experience unpleasant physical symptoms such as dizziness, nausea, headaches, eyestrain, and/or fatigue. Such problems may be exacerbated, e.g., if the application 114 requires the virtual environment 106 to undertake significant additional processing, supplemental to the rendering of the virtual objects 110, which may exceed a computational workload threshold within which the latency of the virtual environment 106 is consistently maintained. Many such disadvantages may arise from various embodiments of the techniques presented herein.

B. Presented Techniques

The present disclosure provides techniques for presenting the content of an application within a virtual environment that is distinctive with respect to the current set of options comprising "flat" applications, "immersive" applications, and "hologram" integration. In an example of the currently presented techniques, an application is presented within a rectangular plane of the virtual environment that incorporates a depth component with respect to a three-dimensional space of the virtual environment. In contrast with "flat" applications in which all application content is confined by a two-dimensional frame, this example of the currently presented technique enables content of the application to appear in front of and/or behind the application plane— similar to the manner in which objects viewed through a real-world window are not stripped of a visual depth component, but rather retain a depth-based appearance even when viewed from an inside portion through the two-dimensional window pane. Additionally, in some embodiments, objects may appear to project forward toward the user in front of the two-dimensional application plane, e.g., reaching through the window toward the user. In some embodiments, when viewed from a particular perspective (e.g., when viewed from an angle), an object within the application may extend beyond the visual confines of the application region. In other embodiments, the object may be clipped to and confined within the application region, thus permitting the perception of depth while also maintaining the application region as a visual boundary for the application content. Moreover, the present disclosure provides numerous techniques for achieving the implementation of such appearance, e.g., in order to promote efficiency, reduce visual latency, and/or adapt contemporary visual processing resources to incorporate a variation of the techniques presented herein.

Figure 2:
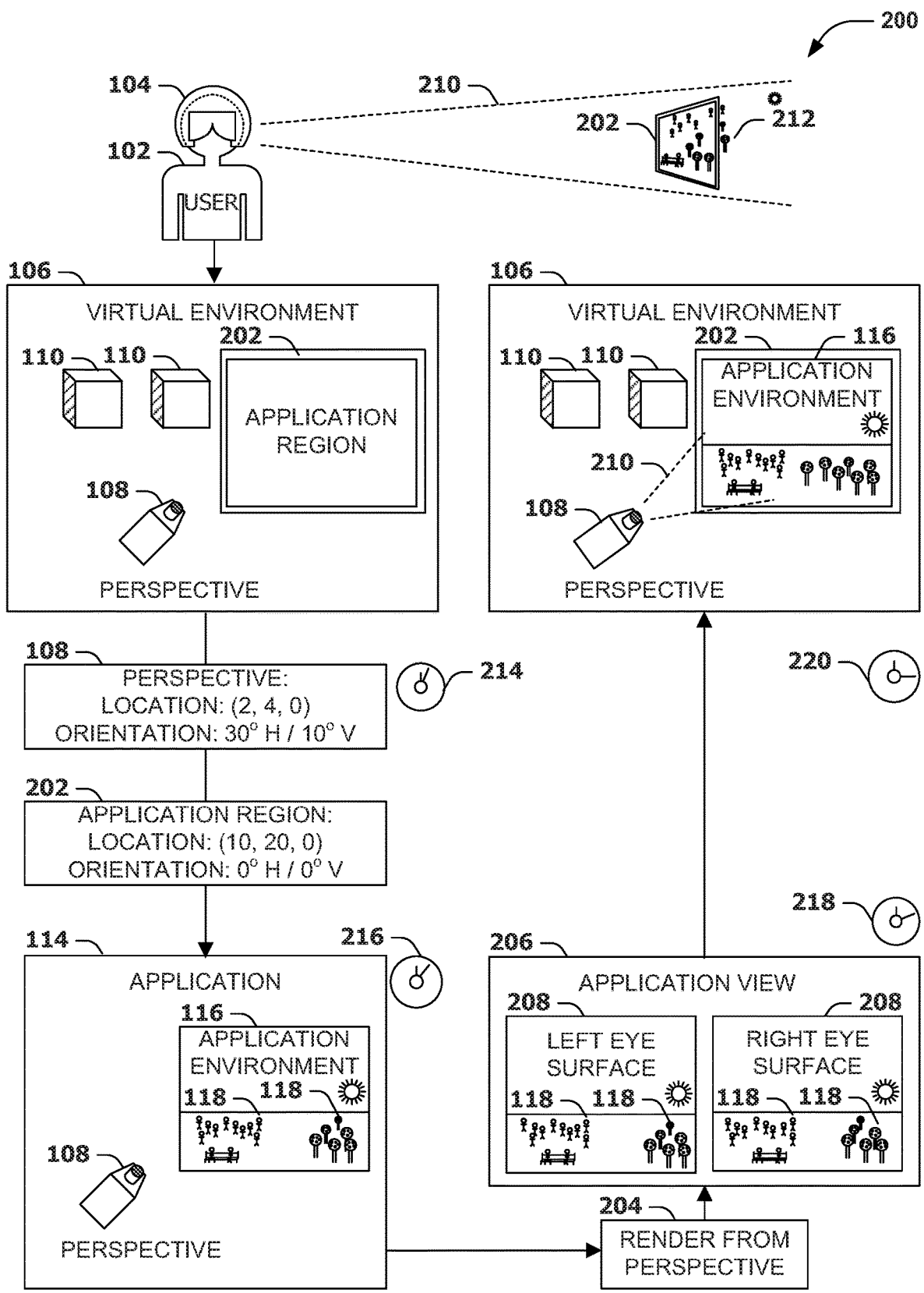
FIG. 2 is an illustration of an example scenario featuring a presentation of an application within a virtual environment in accordance with the techniques presented herein.

FIG. 2 is an illustration of an example scenario 200 featuring a presentation of an application environment 116 of an application 114 within a virtual environment 106 in accordance with the techniques presented herein.

In this example scenario 200, the application region 116 again comprises a set of application models 118, such as text, images, movies, and/or two- and/or three-dimensional models that comprise the application environment 116, and the virtual environment 106 again comprises a set of virtual objects 110 and a dynamic perspective 108 of the user 102. The headset 104 of the user 102 integrates the application environment 116 with the virtual environment 106 in the following manner.

The virtual environment 106 defines an application region 202 within the virtual environment 106 in which the application environment 116 of the application 114 is to be presented. The application region 202 may comprise, e.g., a two-dimensional plane within the virtual environment 106, and/or a three-dimensional surface, such as a curved plane or a sphere, within which the application environment 116 is to be presented.

The virtual environment 106 identifies a perspective 108 of the user 102 within the virtual environment 106, such as the location and/or orientation of the perspective 108 relative to the virtual objects 110 and/or the application region 202. The user 102 may alter the dynamic perspective 108, e.g., by tilting or tipping the head, changing posture, physically moving his or her body, and/or providing user input such as through a manual controller.

The virtual environment 106 notifies the application 114 of the application region 202 and the perspective 108 of the user 102 within the virtual environment 106. As the application region 202 and/or the perspective 108 of the user 102 change, the virtual environment 106 may update the application 114.

The application 114 performs a rendering 204 of the application view 206 from the perspective 108 of the user 102 within the virtual environment 106 relative to the application region 202. For example, if the perspective 118 is virtually positioned ten meters away from the application region 202, and with a 10-degree downward vertical tilt and a 30-degree horizontal rotation (such as an angle of incidence between a plane of the application region 202 and the perspective 108 of the user 102), the application 114 may render 204 an application view 206 of the application environment 116 that matches this geometry and geometrically matches the relative perspective 108 of the user 102 incident to the application region 202.

The virtual environment 106 receives, from the application 114, an application view 206 of the application from the perspective 108 of the user 102, and inserts the application view 206 of the application 114 into the application region 202 of the virtual environment 106. The virtual environment 106, including the application region 206, is then presented to the user 102 (e.g., by displaying the virtual environment 106 on each of two binocular displays mounted within a headset 104 such as a virtual reality helmet).

Optionally, the presentation may provide a stereoscopic presentation of the application environment 116 within the virtual environment 106. For example, the application view 206 may be presented as a pair of binocular surfaces 208, such as a left eye surface 208 that presents a left eye view of the application environment 116, and a right eye surface 208 that presents a right eye view of the application environment 116 from a slightly rightward-shifted perspective 118, wherein degrees of parallax may indicate the relative depths of the application models 118. From the perspective 108 of the user 104, the application region 202 may depict a relative parallax shift between the binocular displays that causes some application models 118 to appear 210 to the user 102 to exist at a location behind 212 the surface of the application region 202. That is, the application region 202 may exhibit a binocular depth of application models 118 in front of and/or behind the application region 202, while nevertheless confining the application objects 118 to the boundaries of the application region 202. That is, the user 102 may shift perspective 108 to walk around the application region 202, causing the relative parallax shift to make closer application objects 118 laterally shift further than more distant application objects 118, thus conveying a sense of depth. However, in some embodiments, some application models 118 may be "clipped" or partially occluded if the perspective 108 of the user 104 and the relative depth of the application model 118 would require at least a portion of the application model 118 to appear outside the application region 202. This feature may enable the user 102 to view and/or hide application models 118 or portions thereof at the boundaries of the application region 202 by shifting perspective 108 to make such application models 118 appear and/or disappear, respectively. In this manner, the virtual environment 106 and the application environment 116 may be integrated and presented to the user 102 in accordance with the techniques presented herein.

C. Technical Effects

The use of the techniques presented herein in the field of virtual environments may provide a variety of technical effects.

A first technical effect that may be achieved by the use of the techniques presented herein is an appealing and consistent integration of the application environment 116 within the presentation of the virtual environment 106. The techniques presented herein enable the application environment 116 to be presented in a manner that is accurate and faithful to the application 114, without resorting to distortion such as by flattening the application environment 116 and discarding depth information, and by utilizing the existing rendering process of the application 114, such as shaders, lighting models, and rendering techniques, such as may occur with the flattening of the application environment 116. Additionally, the insertion of the application view 206 into the application region 202, for presentation concurrently with the virtual objects 110 of the virtual environment 106 enables a concurrent view and/or interaction with both environments, which may logically extend to the inclusion of multiple application regions 202 respectively presenting application views 206 of different applications 114, which may be unachievable with the singular, mutually exclusive presentation model of immersive views. Additionally, the enclosure of the application environment 116 within the application region 202 maintains a visual delineation between the application environment 116 and the virtual environment 106, thereby avoiding a dissonance or inconsistency of presentation styles and/or a collision between object models, such as may occur in a strictly holographic view, as well as potential incompatibility where the application models 118 cannot be accurately rendered into the virtual environment 106 (e.g., wherein application 114 and the application environment 116 utilize a shader that is not supported by the virtual environment 106). The use of the techniques presented herein, such as depicted in the example scenario 200 of FIG. 2, may therefore provide a variety of visual advantages over alternative techniques for integrating the application environment 116 with the virtual environment 106, such as those depicted in the set 100 of example scenarios of FIG. 1.

A second technical effect that may be achieved by the use of the techniques presented herein is a desirable reduction of latency in the presentation of the application environment 116 and the virtual environment 106. As one such example, the arrangement depicted in the example scenario 200 of FIG. 2 enables a fast, efficient, and consistent workflow and division of processing labor between the application 114 and the virtual environment 106. For example, the virtual environment 106 may render the virtual objects 110 and the light source 112 while, concurrently, the application 114 renders the application environment 116 and the application models 118 from the perspective 108 of the user 102 within the virtual environment 106. This architecture may enable parallelization of rendering these distinct environments, and a convenient and efficient mechanism for a shared interaction and the delivery of the application view 206 for inclusion in the application region 202. For example, the application 114 may confine the rendering process to the application models 118 presented in the application view 206, and may forego the rendering of application models 118, other portions of the scene such as background, and/or rendering effects that are partially or wholly occluded from the application view 206. The parallelization and/or efficiency of the architecture may enable a headset 104 to maintain a consistently low latency, thereby mitigating visual artifacts such as framerate hitches, movement latency, shear, and/or poorly synchronized update consistency between the virtual environment 106 and the application environment 116, including unpleasant physical side-effects such as dizziness, nausea, headaches, eyestrain, and/or fatigue.

A third technical effect that may be achieved by the use of the techniques presented herein is the consistent application of the perspective 108 of the user 102 to both the virtual environment 106 and the application environment 116. In accordance with such techniques the presentation of the application environment 116 reflects the perspective 108 of the user 102 within the virtual environment 106 relative to the application region 202; e.g., as the user 102 shifts perspective 108 within the virtual environment 106, the virtual objects 110 and the application view 202 are updated in synchrony to reflect the new perspective 108. The inclusion of the application environment 116 in the application region 202 therefore avoids exhibiting the perspective-agnostic experience of walking around a static painting, such as may occur in a flat view of the application environment 116. Additionally, the integrated presentation may enable a binocular presentation of the application environment 116, in which the application region 202 exhibits a depth that appears to extend in front of and/or behind 212 the application region 202, while nevertheless remaining confined by the boundaries of the application region 202 according to the perspective 106 of the user 102. Many such technical effects may be achievable through the use of the techniques presented herein.

D. Example Embodiments

Figure 3:
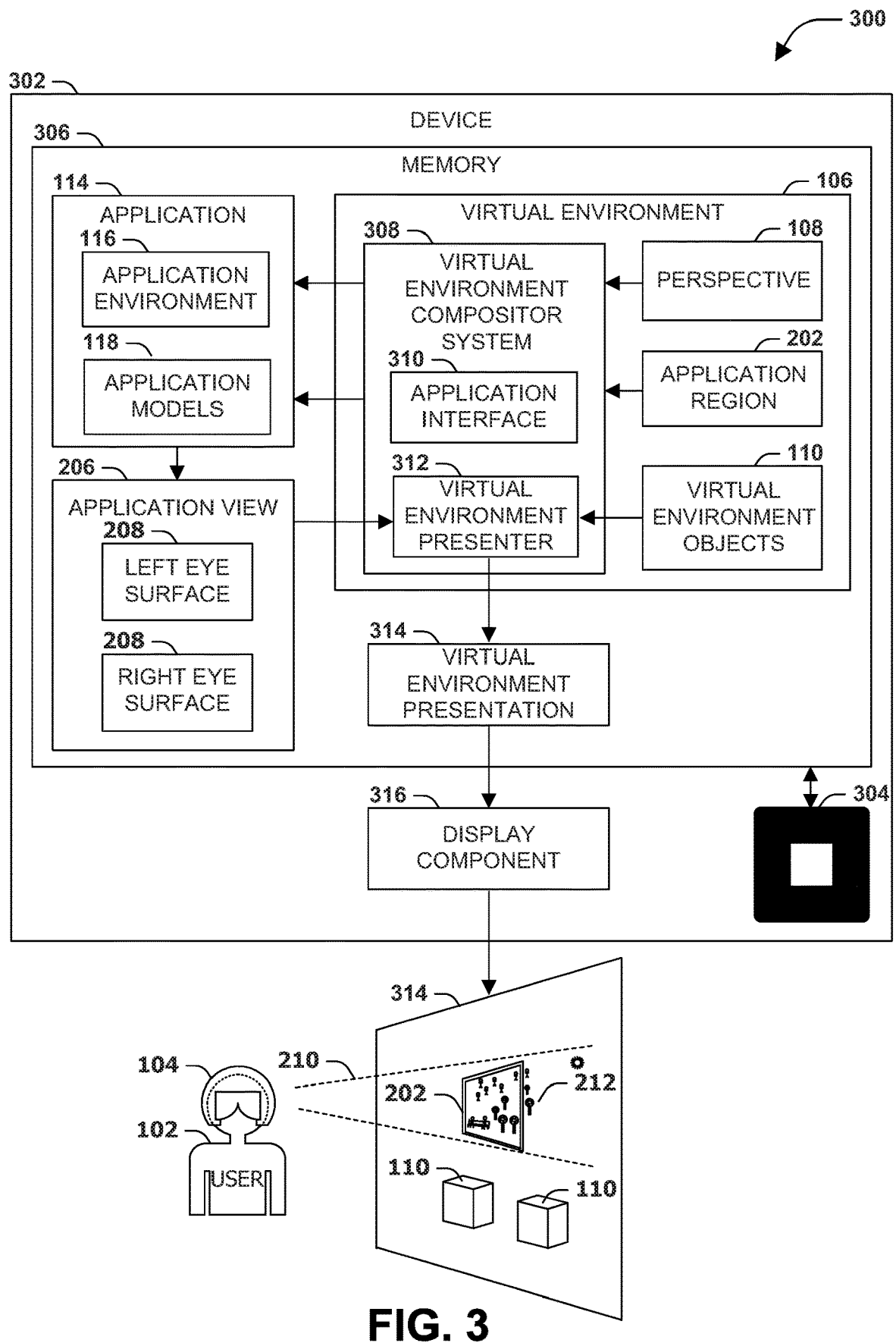
FIG. 3 is an illustration of an example device and an example virtual environment compositor system that present an application within a virtual environment in accordance with the techniques presented herein.

FIG. 3 is an illustration of an example scenario 300 featuring a set of example embodiments that present an application environment 116 within a virtual environment 106 in accordance with techniques presented herein.

In this example scenario 300, an example device 302 is provided that comprises a processor 304 and a memory 306 storing a virtual environment 106 and an application 114. The virtual environment 106 is to be presented to the user 102 of a headset 104, such that the application models 118 appear concurrently with the virtual objects 110 of the virtual environment 106 in a manner that reflects the perspective 108 of the user 102 within the virtual environment 106, while also presenting a stereoscopic view in which the application models 118 may appear 210 to exist behind 212 and/or in front of an application region 202 of the application 114.

The example device 302 achieves this result through the use of a virtual environment compositor system 308 that composes the presentation of the virtual environment 106 that includes an application view 206 of the application 114. In this example scenario 300, the virtual environment compositor system 308 comprises instructions stored in the memory 306 that are executed by the processor 304; however, in some embodiments, the virtual environment compositor system 308 may comprise other forms, such as one or more discrete hardware elements, components or resources of a display adapter or display adapter driver, and/or resources of an application programming interface, runtime, and/or graphics library provided by the device 302 or a remote device 302, such as a cloud server.

The virtual environment compositor system 308 comprises an application interface 310, which notifies the application 114 of an application region 202 within the virtual environment 106, and the perspective 108 of the user 102 within the virtual environment 106. The application interface 310 also receives, from the application 114, an application view 206 of the application environment 116 from the perspective 108 of the user 102. The virtual environment compositor system 308 also comprises a virtual environment presenter 312, which defines the application region 202 within the virtual environment 106 and identifies the perspective 108 of the user 102 within the virtual environment 106. The virtual environment presenter 312 also inserts the application view 206 of the application 114, received by the application interface 310, into the application region 202 of the virtual environment 116, and presents the virtual environment 106, including the application environment 116 within the application region 202, to the user 102, such as using a display component 316 of the headset 104. The resulting presentation 314 of the virtual environment 106 and the application environment 116 therefore achieves an integrated presentation of the virtual environment 106 and the application environment 116 in accordance with the techniques presented herein.

Figure 4:
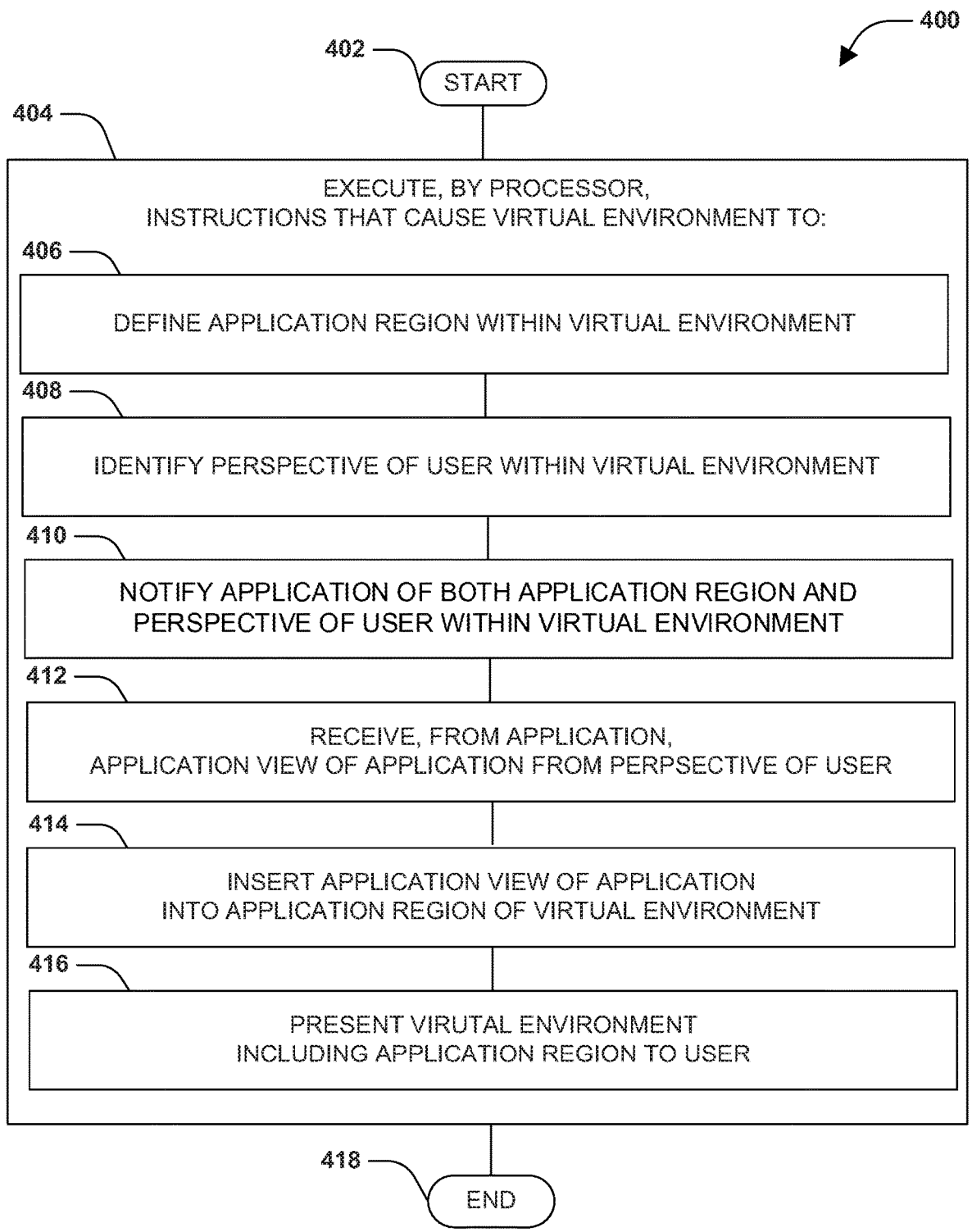
FIG. 4 is an illustration of an example method of presenting an application within a virtual environment in accordance with the techniques presented herein.

FIG. 4 is an illustration of a second example embodiment of the techniques presented herein, illustrated as an example method 400 of presenting a virtual environment 106 including an application 114 to a user 104. The example method 400 involves a device 302 having a processor 106, and may be implemented, e.g., as a set of instructions stored in a memory 304 of the query processor 102, such as firmware, system memory, a hard disk drive, a solid-state storage component, or a magnetic or optical medium, wherein the execution of the instructions by the processor 106 causes the device 302 to operate in accordance with the techniques presented herein.

The example method 400 begins at 402 and involves executing 404 the instructions on the processor 106. In particular, executing the instructions causes the virtual environment 106 to define 406 an application region 202 within the virtual environment 106. Executing the instructions further causes the virtual environment 106 to identify 408 a perspective of the user 102 within the virtual environment 106. Executing the instructions further causes the virtual environment 106 to notify 410 the application 114 of the application region 202 and the perspective 108 of the user 102 within the virtual environment 106. Executing the instructions further causes the virtual environment 106 to receive 412, from the application 114, an application view 206 of the application 114 from the perspective 108 of the user 102. Executing the instructions further causes the virtual environment 106 to insert 414 the application view 206 of the application 114 into the application region 202 of the virtual environment 106. Executing the instructions further causes the virtual environment 106 to present 416 the virtual environment 106 including the application region 202 to the user 102. Having achieved the presentation of the application view 206 of the application environment 116 within the application region 202 of the virtual environment 106, the example method 400 achieves the presentation of the application 114 within the virtual environment 106 in accordance with the techniques presented herein, and so ends at 418.

Still another embodiment involves a computer-readable medium comprising processor-executable instructions configured to apply the techniques presented herein. Such computer-readable media may include various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein. Such computer-readable media may also include (as a class of technologies that excludes communications media) computer-computer-readable memory devices, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein.

Figure 5:
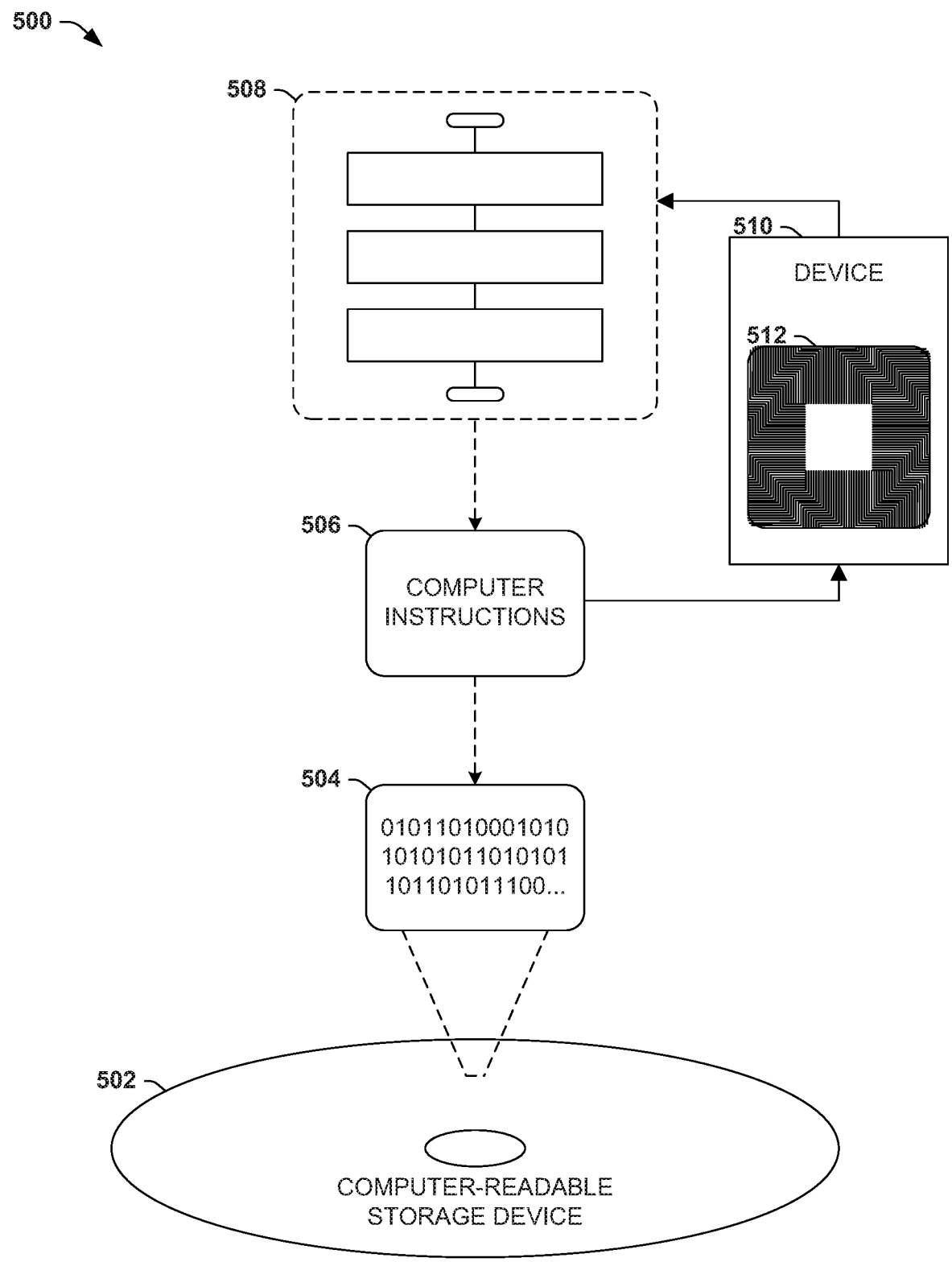
FIG. 5 is an illustration of an example computer-readable storage device that enables a device to present an application within a virtual environment in accordance with the techniques presented herein.

An example computer-readable medium that may be devised in these ways is illustrated in FIG. 5, wherein the implementation 500 comprises a computer-readable memory device 502 (e.g., a CD-R, DVD-R, or a platter of a hard disk drive), on which is encoded computer-readable data 504. This computer-readable data 504 in turn comprises a set of computer instructions 506 that, when executed on a processor 106 of a device 510, cause the device 510 to operate according to the principles set forth herein. For example, the processor-executable instructions 506 may provide a virtual environment compositor system 308 that causes an application 114 to be presented within an application region 202 of a virtual environment 106, such as in the example device 302 and/or the example virtual environment compositor system 308 in the example scenario 300 of FIG. 3. As another example, execution of the processor-executable instructions 506 may cause a device 104 to perform a method of presenting an application 114 within a virtual environment 106, such as the example method 400 FIG. 4. Many such computer-readable media may be devised by those of ordinary skill in the art that are configured to operate in accordance with the techniques presented herein.

E. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the example query processor 302 of FIG. 3; the example virtual reality compositor system 308 of FIG. 3; the example method 400 of FIG. 4; and/or the example computer-readable memory device 500 of FIG. 5) to confer individual and/or synergistic advantages upon such embodiments.

E1. Scenarios

A first aspect that may vary among embodiments of these techniques relates to the scenarios wherein such techniques may be utilized.

As a first variation of this first aspect, the techniques presented herein may be utilized on a variety of devices 302, such as servers, workstations, laptops, consoles, tablets, phones, portable media and/or game players, embedded systems, appliances, vehicles, and wearable devices. Such devices 302 may also include collections of devices, such as a distributed server farm that provides a plurality of servers, possibly in geographically distributed regions, that interoperate to present applications 114 and virtual environments 106. Such devices 302 may also service a variety of users 102, such as administrators, guests, customers, clients, and other applications and/or devices 302. As a further example, the display component 316 through which the virtual environment 106 and/or application 114 are presented may comprise many types of devices, such as headsets 104 (e.g., helmets, glasses, and/or goggles) with monocular and/or binocular displays; monitors; projectors; surfaces of portable devices such as tablets and mobile phones; and display output provided by a device such as a game console to an external display.

As a second variation of this first aspect, the techniques may be utilized with a variety of virtual environments 106 and applications 114. As a first such example, the virtual environment 106 may comprise an immersive virtual reality environment that is isolated from the physical environment of the user 102; an augmented reality environment that complements and/or annotates the physical environment of the user 102, using either a partially transparent display surface and/or a video see-through mode; a heads-up display that simply presents visual content over the user's view of the physical environment; or a combination or variation of such virtual environments 106. As a second such example, the virtual environment 106 and virtual objects 110 may comprise, e.g., an operating system and a visual computing environment in which applications 114 are executed; a professional, social, and/or academic experience; an entertainment and/or educational media presentation; a game; a social networking and/or social media experience; or any other type of virtual environment 106. The virtual environment 106 may be isolated to the user 102 and/or may be a multiuser experience that is shared with other individuals. As a third such example, the application 114 and the application models 118 may also comprise, e.g., an operating system and a visual computing environment in which applications 114 are executed; a professional, social, and/or academic experience; an entertainment and/or educational media presentation; a game; a social networking and/or social media experience; or any other type of application 114 and associated content. In some variations, the virtual environment 106 and the application 114 may comprise different aspects of a single component, such as different aspects and/or presentations of an operating system or runtime platform, and/or different views into a single virtual environment 106. Many such variations of the application models may be suitable for the use of the techniques presented herein.

E2. Integrating Virtual Environment and Application View

A second aspect that may vary among embodiments of these techniques involves the techniques for visually integrating the virtual environment 106 and the application view 206 of the application environment 116 within the application region 202.

As a first variation of this second aspect, the virtual environment 106 may be utilized to present a plurality of applications 114 concurrently within the virtual environment 106. As a first such example, the virtual environment 106 may apply the same application region 202 techniques presented herein to each of several applications; e.g., for both a first application 114 and a second application 114, the virtual environment 106 may define an application region 202, and may present a first application view 206 of a first application environment 116 of the first application 114 within the virtual environment 106 while concurrently presenting a second application view 206 of a second application environment 116 of the second application 114 within the virtual environment 206.

As a second variation of this second aspect, the application region 202 may be defined in a variety of ways. As a first such example, the virtual environment 106 may receiving at least one property of the application region 202 in which the application 114 is to be presented within the virtual environment 106, and may define the application region 202 according to the at least one property of the application region 202. For example, the application 114, the user 104, and/or another element of the device 302 (such as another application 114 or an operating system) may request an application region 202 of a particular shape, size, resolution, and/or display properties such as color depth. The virtual environment 106 may allocate the application region 202 with the specified properties. In particular, the application region 202 may be requested as a stereoscopic application region 202 that is suitable for binocular displays and applications 114 that provide a three-dimensional application view 206 as a binocular surface pair, and the virtual environment 106 may accordingly allocate the application region 202 as a stereoscopic application region 202.

Figure 6:
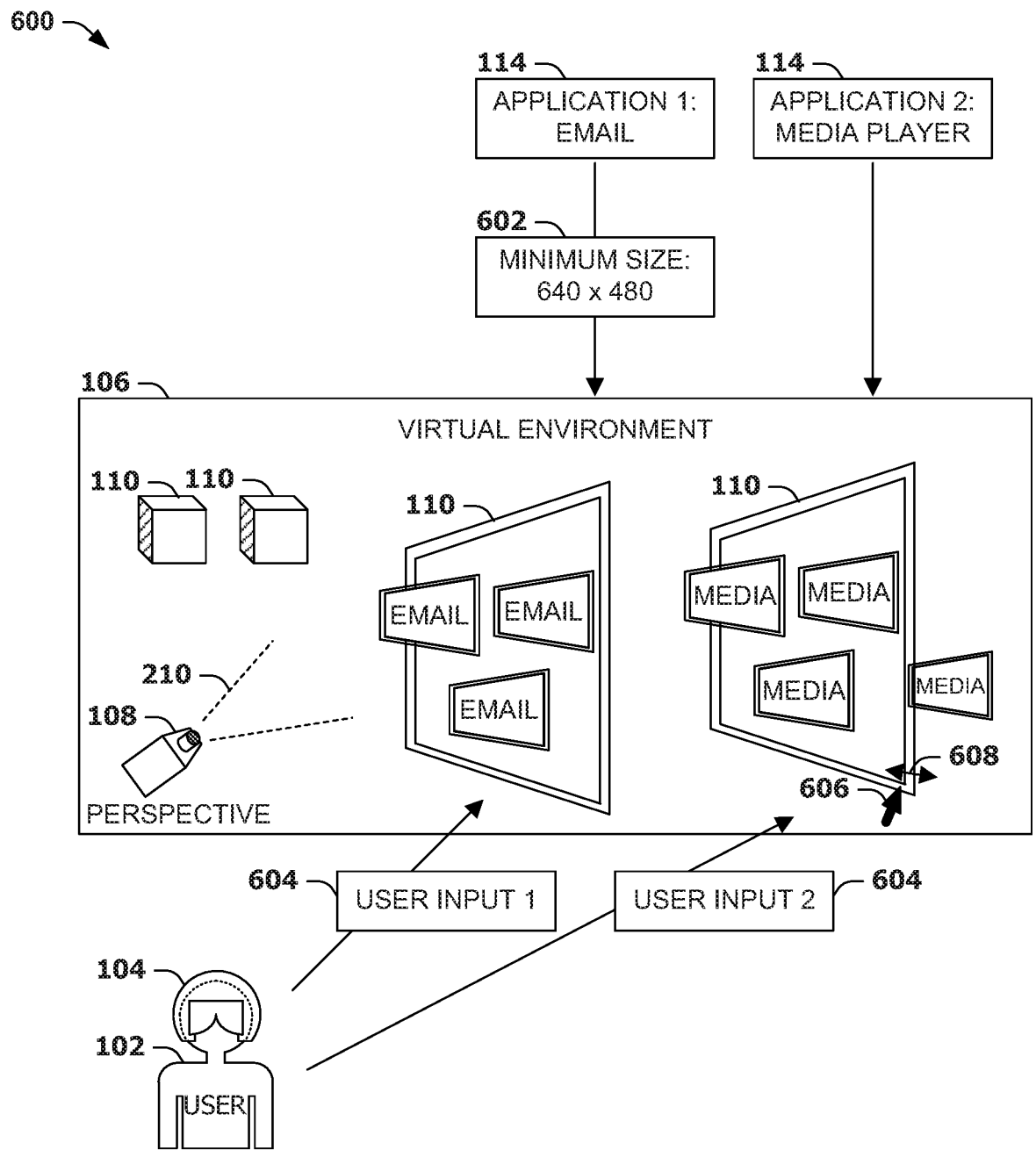
FIG. 6 is an illustration of an example scenario featuring a presentation of multiple applications within a virtual environment in accordance with the techniques presented herein.

FIG. 6 is an illustration of an example scenario 600 featuring a concurrent presentation of multiple applications 114 within a single virtual environment 106. In this example scenario 600, the virtual environment 106 presents a set of virtual objects 110 alongside a first application region 202 of a first application 114 (comprising an email application) and a second application region 202 of a second application 114 (comprising a media application). The user 102 views the virtual environment 106 through a headset 104, which depicts the virtual environment from a particular perspective 108, and the user 104 may direct user input 604 to each of the applications 114 without having to initiate a visual transition therebetween, as both applications 114 are concurrently presented within the visual environment 106. In accordance with the techniques presented herein, the application regions 202 exhibit a binocular view, where some application models 108, from the perspective 108 of the user 102, appear 210 to appear in front of and/or behind 210 the application region 202, while still being contained within the boundaries of the application region 202. Additionally, the first application 114 provides a request for an application region 202 with a particular property 602 (e.g., a minimum resolution that is suitable for displaying the application view 206 of the first application 114), and the virtual environment 106 allocates the application region 202 for the first application 114 according to the property 602 requested by the application 114. Similarly, the user input 604 of the user 102 may include an interaction 606 with a boundary of the application region 202 for the second application 114, such as a request to resize the application region 202, and the virtual environment 106 may accommodate the user input 604 by initiating the resizing 608 of the application region 202. In this manner, multiple applications of various types may be presented within the virtual environment 106 in accordance with the techniques presented herein.

As a third variation of this second aspect, the integration of the application environment 116 with the virtual environment 106 may be adapted in various ways to accommodate the enclosure of the display view 206 within the display region 202. That is, it may be desirable to provide a stereoscopic application view 206 for a three-dimensional application environment 116 wherein application models 118 appear 210 (from the perspective 108 of the user 102) in front of and/or behind 212 the surface of the application region 202. However, some perspectives 108 may result in a translation of one or more application model 118 beyond the boundaries of the application region 202. Various techniques may be utilized to identify and address this aspect of the presentation of the application view 206 within the application region 202, particularly for stereoscopic views.

Figure 7:
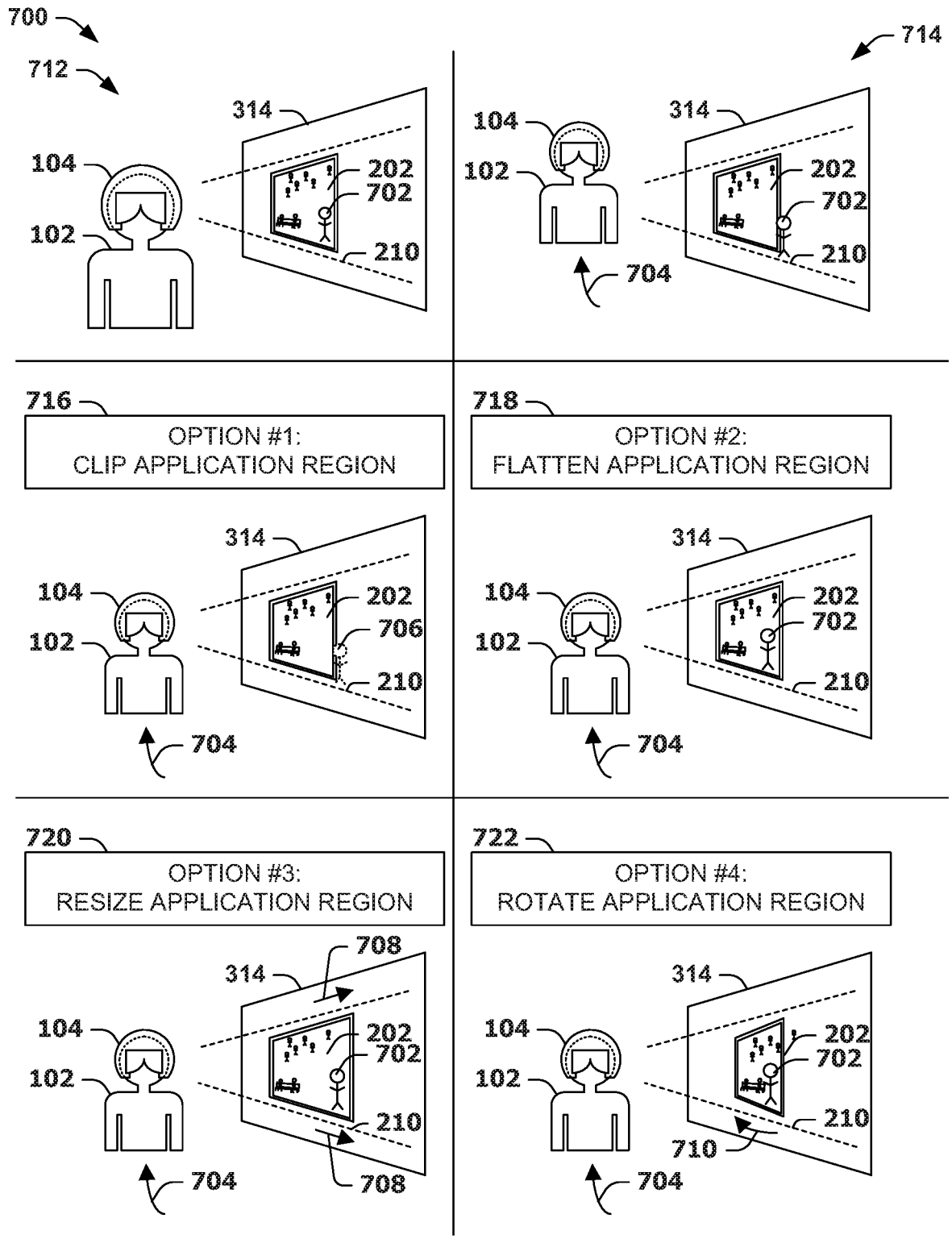
FIG. 7 is an illustration of example scenarios featuring various techniques for adapting a presentation of an application to a virtual environment in accordance with the techniques presented herein.

FIG. 7 is an illustration of a set 700 of example scenarios featuring such techniques. As a first such example 712, while the user 102 is viewing an application region 202 of an application 114 from a first perspective 108 within the virtual environment 106, a particular application model 702 may appear close to the perspective 108, and may appear 210 to be stereoscopically projected in front of the application region 202 but still within the boundaries of the application region 202 in the presentation 314 of the virtual environment 106. Accordingly, as a second example 714, when the user 102 changes 704 the perspective 106 by orbiting the application region 202, the application model 702 (positioned close to the perspective 108 of the user 102) may exhibit a significant degree of parallax shift, such that the application model 702 appears outside the boundaries of the application region 202 in the presentation 314.

In some examples, including the second example 714, such translation may be acceptable and presented without alteration. However, in other embodiments, mitigating techniques may be utilized to reduce and/or prevent the application models 118 from escaping the boundaries of the application region 202.

As a third example 716, the application region 202 may be clipped, such that when a portion of the application view 206 extends beyond a boundary of the application region 202 from the perspective 106 of the user 102, the virtual environment 106 may clip the application view 206 to the boundary of the application region 202 from the perspective 106 of the user 102. For example, the application model 706 may be omitted from the presentation of the application view 206.

As a fourth example 718, the application region 202 may be flattened in this particular circumstance to reduce the extension of the application view 206 beyond the application region 202. For example, when a portion of the application view 206 extends beyond a boundary of the application region 202 due to a depth of the portion of the application view 206, the virtual environment 106 may reduce the depth of the application view 206 into the boundary of the application region 202. The flattening may be applied completely in this circumstance (e.g., flattening the application view 206 into a two-dimensional view) and/or only to a degree that enables the application view 206 to be enclosed by the application region 202. Additionally, the flattening may be applied across the entire application view 206, and/or only to the portions of the application view 206 that extend beyond the boundaries of the application region 202 (e.g., only to the application model 702).

As a fifth example 720, the virtual environment 106 may adapt a boundary of the application region 202 to accommodate the application view 206. For example, the edge of the application region 202 may be extended 708 to encompass the portion of the application view 206 extending beyond the application region 202 from the perspective 108 of the user 102, such as extending 708 the edge of the application region 202 to encompass the application model 702.

As a sixth example 722, as the user 102 orbits 704 the application region 202 causing parallax effects to enable portions of the application view 206 to escape the application region 202, the virtual environment 106 may rotate the application region 206 to face the perspective 108 of the user 102. Rotating the application region 206 may enable the virtual environment 106 to maintain the stereoscopic aspect of the application view 206 (e.g., the application model 702 continues to appear in front of the application region 202) while containing the application view 206 within the application region 202. Many such techniques may be utilized to adapt the application region 202 to the application view 206 in accordance with the techniques presented herein.

As a fourth variation of this second aspect, the integration of the application environment 116 with the virtual environment 106 may be adapted in various ways to share various aspects among the application(s) 114 and/or the virtual environment 106.

Figure 8:
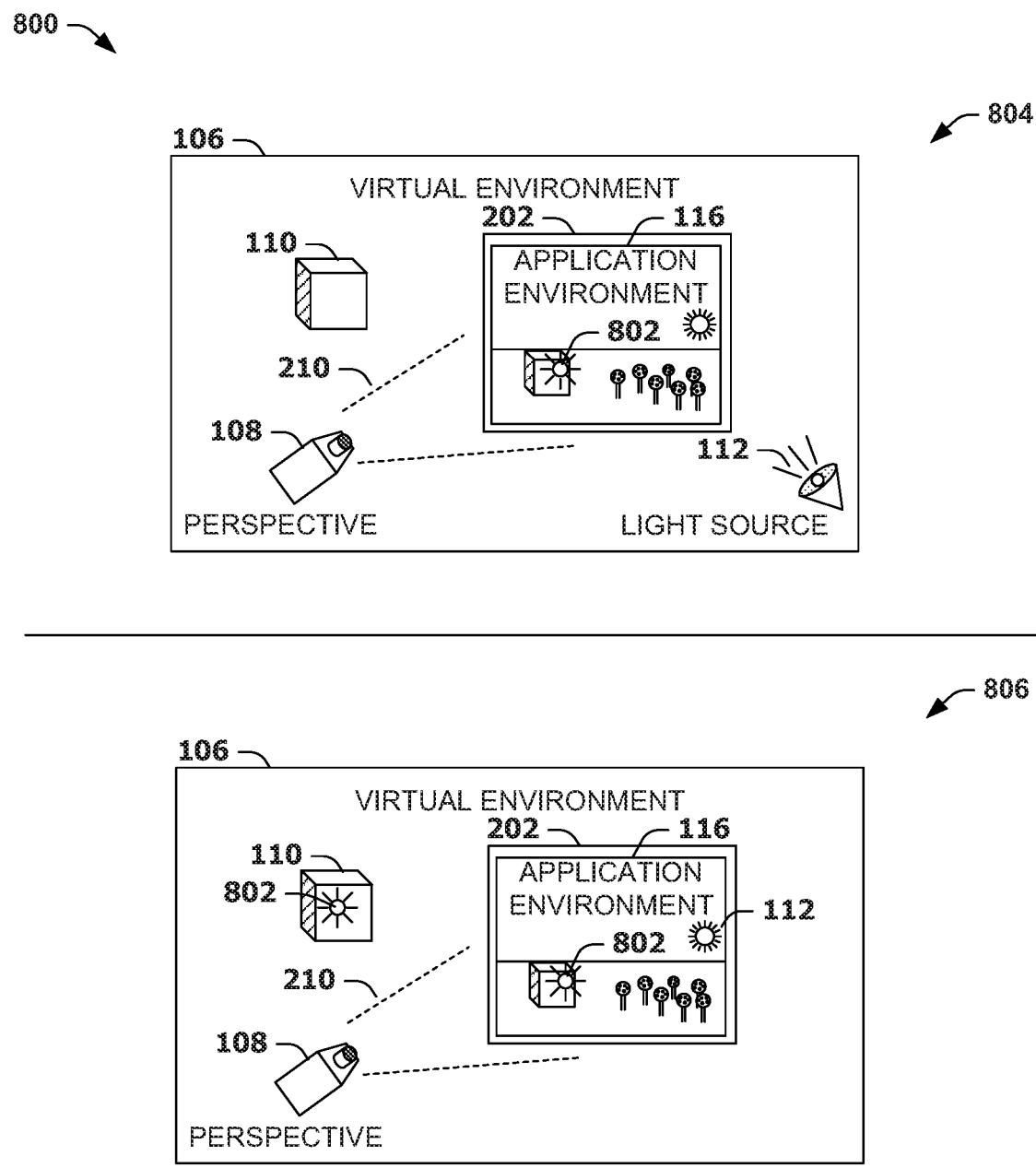
FIG. 8 is an illustration of an example scenario featuring a sharing of a visual effect between an application and a visual environment in accordance with the techniques presented herein.

FIG. 8 is an illustration of a set 800 of example scenarios in which a visual effect is shared between an application environment 116 and a virtual environment 106. As a first example 804, the virtual environment 106 may comprise a visual effect such as a light source 112 that lights various virtual objects 110 (e.g., providing a shadowing of the virtual object 110 from the perspective 108 of the user 102 within the virtual environment 106). The virtual environment 106 further shares the visual effect with the application 114 for inclusion in the application view 206 of the application environment 116. For example, in addition to informing the application 114 of the perspective 118 and the application region 202, the virtual environment 106 may inform the application 114 of the details of the light source 112 within the virtual environment 106, such that a visual effect 802 may appear on an application model 118 within the application environment 116 (e.g., a shadowing of objects within the application environment 116, and/or a glare effect of a reflective surface within the application environment 116). As a second example 806, the application environment 116 may comprise a light source 112, such as a depiction of the sun, and the virtual environment 106 may apply a visual effect of the application environment 116 to the virtual environment 106 (e.g., a shadowing of virtual objects 110 within the virtual environment 106 and/or a visual effect 802 such as glare applied to the surface of a virtual object 110). Such sharing of visual effects may be extended to other scenarios. For example, where the virtual environment 106 concurrently presents application views 206 of two applications 114 wherein a first application environment 116 comprises a visual effect 802, the virtual environment 106 may, in addition to incorporating the visual effect 802 in the virtual environment 106, share the visual effect 802 of the first application 114 with the second application 114 for inclusion in the second application view 206 of the second application environment 116. Such sharing may include details other than light sources. For example, a single long shadow may extend from within an application environment 116 onto a virtual object 110 of the virtual environment 106, an application model 118 may escape the application view 206 of the application region 202 and may instead become a virtual object 110 of the virtual environment 106; and an application model 118 may interact with a virtual object 110, such as a first character in the virtual environment 106 conversing with and/or shaking hands with a second character within the application environment 116.

As a fourth variation of this second aspect, transitions 122 may be provided between an application 114 contained within an application region 206 and other techniques for presenting the application 114, including those presented in the set 100 of examples in FIG. 1. As a first such example, by request of a user 102, the virtual environment 106 may transition 122 from a first presentation 314 of an application 114 within an application region 202 to a flat presentation, e.g., flattening the application to a two-dimensional view. As a second such example, by request of a user 102, the virtual environment 106 may transition 122 from a first presentation 314 of an application 114 within an application region 202 to an immersive presentation, e.g., supplanting the virtual environment 106 with an exclusive presentation 314 of the application environment 116. As a third such example, by request of a user 102, the virtual environment 106 may transition 122 from a first presentation 314 of an application 114 within an application region 202 to a holographic presentation, e.g., integrating the application models 118 of the application environment 116 with the virtual environment 106. Many such variations in the sharing of effects among application environments 116 and the virtual environment 106 may be included in variations of the techniques presented herein.

E3. Processing Workload Division and Delegation

A third aspect that may vary among embodiments of these techniques involves techniques for dividing the processing workload between the virtual environment 106 and the application 114 that may provide a parallelizable, synchronized, integrated presentation.

As a first variation of this third aspect, the virtual environment 106 may comprise a stereoscopic virtual environment 106. The application view 206 received from the application 114 may further comprise: a left eye surface 208 and a right eye surface 208 that together present a stereoscopic application view 206, and the virtual environment 106 (e.g., a headset 104) may present the left eye surface 208 to a left eye of the user 102 and the right eye surface 208 to a right eye of the user 102.

As a second variation of this third aspect, the perspective of the user 102 within the virtual environment 106 may involve identifying at least one orientation property of a head of the user 102 viewing the virtual environment 106 (e.g., the headset 104 may include an inertial measurement unit that measures the turning and/or tilting of the user's head), and the virtual environment 106 may notify the application 114 of the at least one orientation property of the head of the user 102.

As a third variation of this third aspect, a variety of architectures may be utilized for the virtual environment 106 and the application 114, and the interaction therebetween the coordinate the presentation of the virtual environment 106. As a first such example, the application 114 may further comprise an application view render thread that is hosted by the virtual environment 106. The virtual environment 106 may notify the application 114 of the application region 202 and the perspective 106 by directly sharing the application region and the perspective with the application view render thread, and/or may receive the application view 206 directly from the application view render thread. As a second such example, the application 114 may further comprise an application view render thread that is external to the virtual environment 106 (e.g., executing within a separate application process). The virtual environment 106 may notify the application 114 of the application region 202 and the perspective 108 by storing information about the application region 202 and the perspective 108 in a shared memory region that is accessible to the application view render thread, and/or may retrieve the application view 206 of the application view render thread from the shared memory region.

As a third such example, the application 114 may further comprise an application view render thread that executes asynchronously as compared with the virtual environment 106. The virtual environment 106 may receive the application view 206 by asynchronously identifying an available application view 206 provided by the application 114, and responsive to asynchronously identifying the available application view 206, inserting the available application view 206 into the application region 202. That is, the application 114 may render frames of the application view 206 at its own pace and asynchronously as compared with the virtual environment 106, and the virtual environment 106 may integrate the frames of the application 114 as they become available.

As a fourth variation of this third aspect, applications 114 are often rendered and composited via a shared surface between the application 114 and a virtual environment compositor system 308, and an application 114 may render its content into the shared surface and then signal the virtual environment compositor system 308, which may then read from the shared surface to produce the rendered scene. In accordance with the present disclosure, this interaction may involve providing the application 114 with two shared surfaces for the "left-eye view" and one for the "right-eye view". The application 114 may be provided information about the left and right perspectives within the virtual environment 106 (e.g., the position and orientation of the perspective for each eye), as well as the position of the application 114 within the rendered scene. Other information may be included, such as a tracking timestamp and/or head-tracking data to fine-tune the position of the application content, e.g., to compensate for the latency between the left/right camera position at the time the content was generated and the expected left/right camera position at the time the final scene is going to be consumed. The application 114 may use this information to render its content from the left perspective and right perspective into the corresponding surfaces. The application 114 may signal the virtual environment compositor system 308, which then reads from both surfaces and uses the left-eye view content when generating the final left-eye scene and the right-eye view content when generating the final right-eye scene. As a result, the perception of positioning and depth is preserved as if the content were rendered directly into the scene. Many such techniques may be utilized to provide an architecture and processing pipeline for integrating the application view 206 of the application environment 116 with the virtual environment 106 in accordance with the techniques presented herein.

E4. Latency Reduction and/or Mitigation

A fourth aspect that may vary among embodiments of these techniques involves techniques for reducing the latency of the presentation within a desired latency threshold, and/or mitigating the effects of latency above the desired latency threshold.

As noted herein, in many scenarios (such as displays within headsets 104), maintaining a low latency is desirable to provide a pleasant user experience and/or to reduce unpleasant side-effects such as dizziness and headaches. For example, in the example scenario 200 of FIG. 2, it may be desirable to provide an architecture with a division of processing load that enables a comparatively fast, efficient, and consistent workflow between the virtual environment 106 and the application 114. For example, at a first time 214, the virtual environment 106 may notify the application 114 of the perspective 108 and the application region 202; the at a second time 216, the application 114 may receive the perspective 108 and begin rendering 204 the application view 206; at a third time 218, the application 114 may notify the virtual environment 106 that the application view 206 is available; and at a fourth time, the virtual environment 106 may provide a presentation 314 that integrates the application view 206 of the application 114. It may be desirable to provide an architecture in which this process may be completed for the substantial entirety of frames within a timestamp threshold, such as consistently presenting frames within the 90 Hz refresh rate of a headset 104, and with at most one frame of latency.

It may be appreciated that the architecture provided herein may promote the consistent completion of this workflow within the latency threshold, e.g., by dividing the processing load between the application 114 and the virtual environment 106 to achieve efficiency via parallelization, an/or by arranging the sharing of information among the virtual environment 106 and the one or more applications 114 such as through the architectures provided herein. This effect is also achieved, e.g., by the two-way communication provided between the application 114 and the virtual environment 106, such as shown in the example scenario 200 of FIG. 2, in contrast with the variations presented in the set 100 of examples of FIG. 1, in which the application 114 simply feeds information into the virtual environment 106 without significant communication received from the virtual environment 106.

Additional techniques may also be utilized to reduce the latency of the rendering process. As a first such example, the device may provide the virtual environment 106 with a timestamp of various rendered frames, and the virtual environment 106 may notify the application 114 of the timestamp of the virtual environment 106 in which the application view 206 is to be presented. Additionally, the device may detect a temporal difference between the application view 202 of the application 114 to be included in the virtual environment 106 and a timestamp of the virtual environment 106 in which the application view 206 is to be presented. The device may adjust the application view 206 to reduce the temporal difference between the application view 206 and the timestamp of the virtual environment 106 as perceived by the user 102.

As a second such example, if latency is detected to exceed a desired threshold, a variety of mitigation techniques may be utilized. As a first such example, the application 114 may be requested to reduce the application view 206 to a lower visual quality, such as a simpler rendering process and/or a lower resolution. As a second such example, the virtual environment 106 may request the application 106 to render at a lower framerate that is consistently sustainable. As a third such example, a variety of techniques may be utilized to compensate for a late frame, such as late stage reprojection ("LSR") techniques. For example, if the perspective 108 is being laterally translated within the virtual environment 106, a late-received application view 206 may be correspondingly visually translated such that the positions of the application models 118 within the application environment 116 properly reflect the lateral translation of the perspective. Many techniques may be utilized to maintain a low latency, and/or to mitigate an undesirably high latency, in accordance with the techniques presented herein.

F. Additional Examples

The following examples provide more context about the manner in which the techniques presented herein may be applied.

Figure 9:
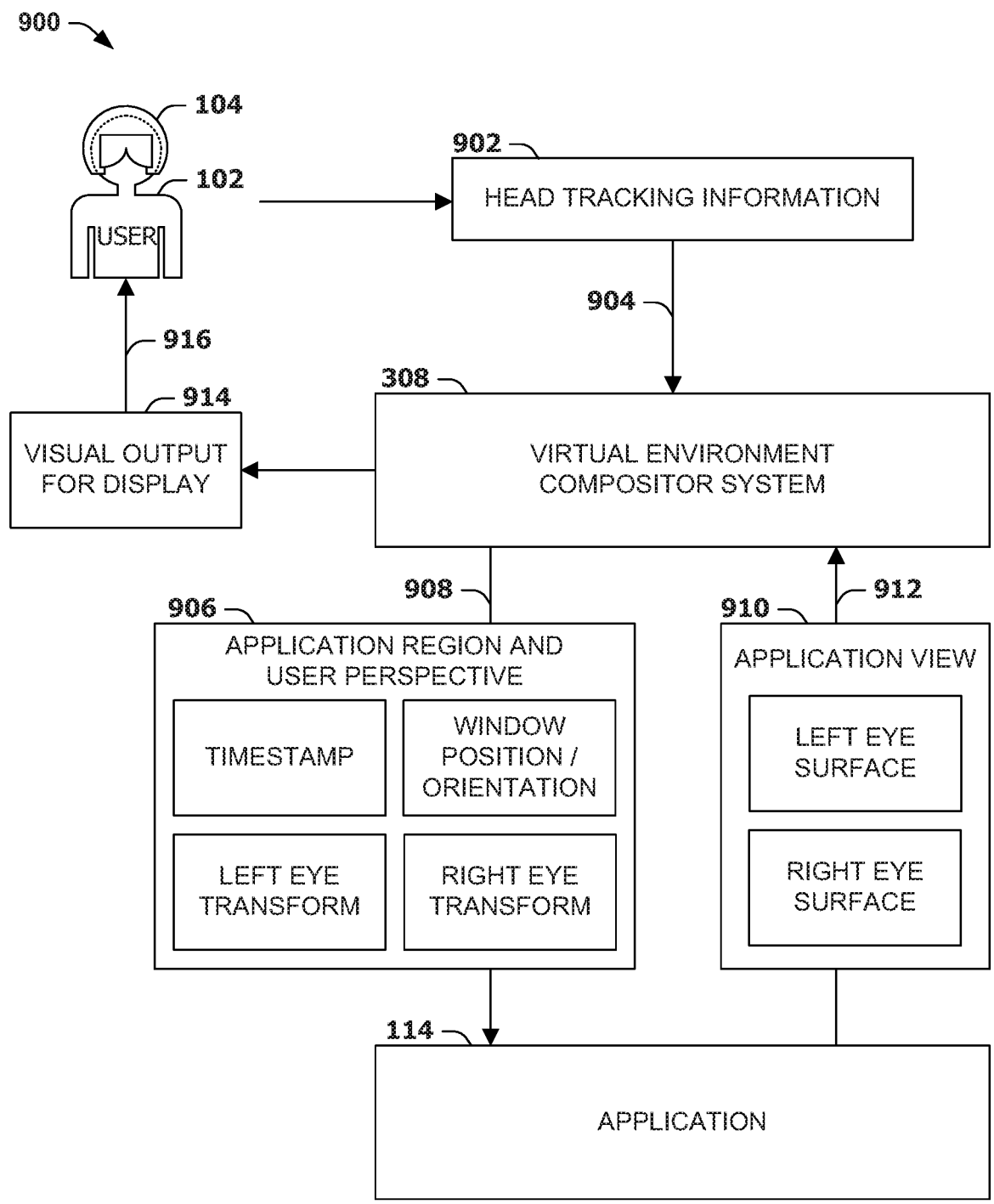
FIG. 9 is an illustration of an example scenario featuring an example process embodiment of the techniques presented herein.

FIG. 9 is an illustration of an example scenario 900 depicting an example process embodiment of the techniques presented herein. In this example scenario, an application 114 interacts with a virtual environment compositor system 308 to present content within a virtual environment in accordance with the techniques presented herein. In this example scenario 900, a headset 104 of a user 102 generates a set of head tracking information 902 and sends 904 such information to the virtual environment compositor system 308 (e.g., the position, size and orientation of the application 114 within the virtual environment, and the current position and orientation of the user 102). If the application renderer is hosted in a dedicated thread inside the virtual environment compositor system 308, the information can be shared via a shared interface. Alternatively, if the application renderer resides in the process of the application 114, a communication mechanism may be used to deliver the information, such as a shared memory area.

The virtual environment compositor system 308 performs some initial rendering, resulting in the generation of a set of information about the application region and user perspective 906, e.g., the window position and orientation of the application 114; a rendering timestamp; and transforms for the left-eye and right-eye perspectives. The virtual environment compositor system 308 sends 908 this information to the application 114, which signals 912 to the virtual environment compositor system 308 that an application view 910 is available, such as a left eye surface comprising the perspective of the content of the application 114 from the left eye of the user 102 and a right eye surface comprising the perspective of the content of the application 114 from the right eye of the user 102. The virtual environment compositor system 308 inserts the application view 910 into the visual output 914 and transmits 916 the visual output 914 to the headset 104 for display to the user 102. In this manner, the content of the application 114 may be integrated with the virtual environment in accordance with the techniques presented herein.

Figure 10:
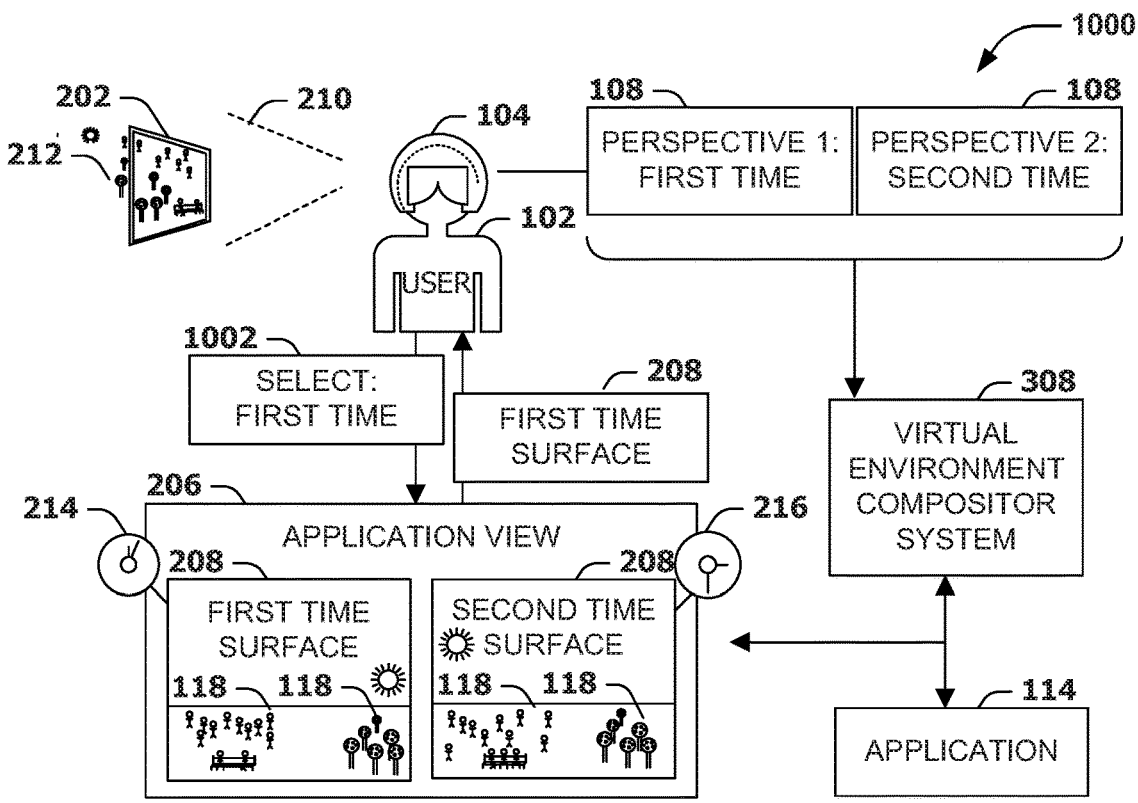
FIG. 10 is an illustration of a first example scenario in which a variation of the currently presented techniques is applied.

FIG. 10 is an illustration of a first example scenario 1000 in which a variation of the currently presented techniques is applied. In this first example scenario 1000, a virtual environment compositor system 308 and an application 114 interoperate to generate two surfaces that respectively incorporate the output of the application 114, but do so in a manner that is not necessarily used for stereoscopic presentation; rather, the surfaces 208 present different perspectives 108 of the content of the virtual environment, including the application 114, at different times, such as views of a scene at a first time 214 and a second time 216. The application 114 may concurrently generate and present to the virtual environment compositor system 308 surfaces 208 for both times, and a headset 104 of the user 102 may choose to present one or the other. For example, the user 102 may initiate a selection 1002 of either the first time 214 or the second time 216, and the headset 104 may toggle between the presentations in a seamless and rapid manner, since both surfaces 208 are available. As another example, the headset 104 may blend the surfaces 208, e.g., merging the surfaces 208 with a 50%/50% alpha channel to present a graphic composite of the scene at different times. Such presentation may be advantageous, e.g., for generating novel, interesting, and/or useful variations of a single perspective 108 of a scene; e.g., a user may watch an overlay of a scene at different times to perform a visual comparison and identify material differences in the content of the application 114 at different times. The configuration of the virtual environment compositor system 308 and the application 114 to generate multiple surfaces 208 for different times 216 may facilitate the capability of the headset 104 to display such presentations for the user 102 in a rapid manner.

Figure 11:
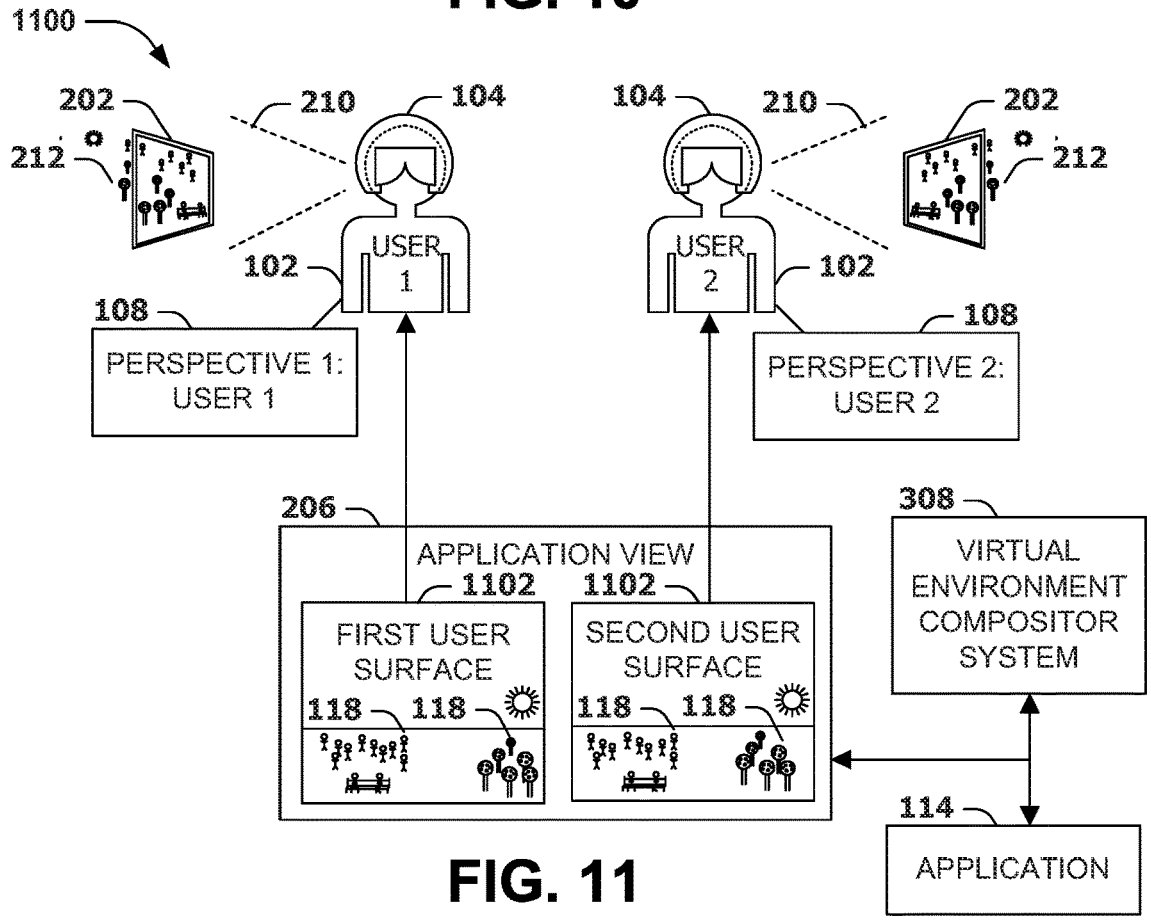
FIG. 11 is an illustration of a second example scenario in which a variation of the currently presented techniques is applied.

FIG. 11 is an illustration of a second example scenario 1100 in which a variation of the currently presented techniques is applied. In this second example scenario 1100, a virtual environment compositor system 308 and an application 114 interoperate to generate two surfaces that respectively incorporate the output of the application 114, but do so in a manner that is not necessarily used for stereoscopic presentation; rather, the surfaces 208 present different perspectives 108 of the content of the virtual environment for different users 104, e.g., where the users 104 are positioned at different locations within the virtual environment. The configuration of the virtual environment compositor system 308 and the application 114 to generate multiple surfaces 1102 to present the different perspectives 108 of the different users 102, which are concurrently presented on different headsets 104, may enable each user 102 to view a different and user-specific view of the scene, including the application region 202. Such configuration may be advantageous, e.g., for facilitating the reuse of some rendering calculations and processes that are applicable to the application views 206 of both users 102; e.g., some calculations of the application 114, such as a perspective-dependent level of transparency of a semi-transparent and surface, may be materially identical for both perspectives 208, and a single evaluation by the application 114 of the transparency for a single frame may be applicable to the generation of the surfaces 1102 for both users 102. In this manner, the techniques presented herein may facilitate the efficiency of the rendering pipeline when the scene is presented to two or more users 102. Many such variations may advantageously utilize variations of the techniques presented herein to generate a virtual environment including an application 114 in accordance with the present disclosure.

G. Usage of Terms

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. One or more components may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Any aspect or design described herein as an "example" is not necessarily to be construed as advantageous over other aspects or designs. Rather, use of the word "example" is intended to present one possible aspect and/or implementation that may pertain to the techniques presented herein. Such examples are not necessary for such techniques or intended to be limiting. Various embodiments of such techniques may include such an example, alone or in combination with other features, and/or may vary and/or omit the illustrated example.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A device that presents a virtual environment including an application to a user, the device having a processor and comprising:
    executing, by the processor, instructions that cause the virtual environment to:
        define an application region within the virtual environment;
        identify a perspective of the user within the virtual environment;
        notify the application of both the defined application region within the virtual environment and the perspective of the user within the virtual environment;
        receive, from the application, an application view that includes a view of the application from the perspective of the user relative to the defined application region, wherein the application view includes a view of one or more application models that initially extend beyond a boundary of the application region when viewed from the perspective of the user; and
        present the application view inserted into the defined application region of the virtual environment with a reduced depth of the one or more application models that initially extended beyond the boundary of the application region when viewed from the perspective of the user, such that the one or more application models no longer extend beyond the boundary of the application region when viewed from the perspective of the user.

2. The device of claim 1, wherein defining the application region further comprises:
    receiving at least one property of the application region in which the application is presented within the virtual environment; and
    defining the application region according to the at least one property of the application region.

3. The device of claim 1, further comprising rotating the application region to face the perspective of the user.

4. The device of claim 1, wherein the application view includes a right eye view of the application from the perspective of a right eye of the user relative to the defined application region and a left eye view of the application from the perspective of a left eye of the user relative to the defined application region.

5. The device of claim 1, wherein:
    the virtual environment further comprises a stereoscopic virtual environment;
    receiving the application view from the application further comprises: receiving, from the application, a left eye surface and a right eye surface that together present a stereoscopic application view; and
    presenting the application view inserted into the defined application region of the virtual environment further comprises: presenting the left eye surface to a left eye of the user; and presenting the right eye surface to a right eye of the user.

6. The device of claim 1, wherein:
identifying the perspective of the user within the virtual environment further comprises: identifying at least one orientation property of a head of the user viewing the virtual environment; and
notifying the application of the perspective of the user further comprises: notifying the application of the at least one orientation property of the head of the user.

7. The device of claim 1, wherein:
presenting the application view inserted into the defined application region of the virtual environment further comprises: presenting the virtual environment according to a timestamp of the virtual environment; and
notifying the application further comprises: notifying the application of the timestamp of the virtual environment in which the application view is to be inserted.

8. The device of claim 7, wherein the timestamp of the virtual environment comprises a first timestamp, and wherein:
the device further detects a temporal difference between a second timestamp of the application view and the first timestamp of the virtual environment in which the application view is to be inserted; and
inserting the application view into the defined application region comprises: adjusting the application view to reduce the temporal difference between the second timestamp of the application view and the first timestamp of the virtual environment as perceived by the user.

9. The device of claim 1, wherein:
the application further comprises an application view render thread that is hosted by the virtual environment;
notifying the application of the defined application region and the perspective further comprises: sharing the application region and the perspective with the application view render thread; and
receiving the application view further comprises: receiving the application view from the application view render thread.

10. The device of claim 1, wherein:
the application further comprises an application view render thread that is external to the virtual environment;
notifying the application of both the defined application region and the perspective of the user within the virtual environment further comprises: storing the defined application region and the perspective of the user within the virtual environment in a shared memory region that is accessible to the application view render thread; and
receiving the application view further comprises: retrieving the application view of the application view render thread from the shared memory region.

11. The device of claim 1, wherein:
the application further comprises an application view render thread that executes asynchronously as compared with the virtual environment; and
receiving the application view further comprises: asynchronously identifying an available application view provided by the application; and
inserting the application view into the defined application region comprises: responsive to asynchronously identifying the available application view, inserting the available application view into the application region.

12. The device of claim 1, wherein: the application further comprises a visual effect; and inserting the application view of the application into the defined application region comprises: applying the visual effect of the application to the virtual environment.

13. The device of claim 1, wherein:
the virtual environment further comprises a visual effect; and
notifying the application comprises sharing the visual effect with the application for inclusion in the application view.

14. The device of claim 1, wherein:
the virtual environment further comprises: a first application and a second application; and
presenting the virtual environment further comprises:
presenting a first application view of the first application within the virtual environment; and
concurrently with the first application view, presenting a second application view of the second application within the virtual environment.

15. The device of claim 14, wherein:
the first application further comprises a visual effect; and
notifying the application comprises sharing the visual effect of the first application with the second application for inclusion in the second application view.

16. A method of presenting a virtual environment including an application to a user, the method involving a processor and comprising:
executing, by the processor, instructions that cause the virtual environment to:
define an application region within the virtual environment;
identify a perspective of the user within the virtual environment;
notify the application of both the defined application region within the virtual environment and the perspective of the user within the virtual environment;
receive, from the application, an application view that includes a view of the application from the perspective of the user relative to the defined application region, wherein the application view includes a view of one or more application models that initially extend beyond a boundary of the application region when viewed from the perspective of the user; and
present the application view inserted into the defined application region of the virtual environment with a reduced depth of the one or more application models that initially extended beyond the boundary of the application region when viewed from the perspective of the user, such that the one or more application models no longer extend beyond the boundary of the application region when viewed from the perspective of the user.

17. The method of claim 16, wherein defining the application region further comprises:
receiving at least one property of the application region in which the application is presented within the virtual environment; and
defining the application region according to the at least one property of the application region.

18. The method of claim 16, further comprising rotating the application region to face the perspective of the user.

19. The method of claim 16, wherein the application view includes a right eye view of the application from the perspective of a right eye of the user relative to the defined application region and a left eye view of the application from the perspective of a left eye of the user relative to the defined application region.

20. One or more hardware storage devices having stored thereon computer-executable instructions, the computer-executable instructions being executable by one or more processors of a computer system to cause the computer system to:
- define an application region within a virtual environment;
- identify a perspective of a user within the virtual environment;
- notify an application of both the defined application region within the virtual environment and the perspective of the user within the virtual environment;
- receive, from the application, an application view that includes a view of the application from the perspective of the user relative to the defined application region, wherein the application view includes a view of one or more application models that initially extend beyond a boundary of the application region when viewed from the perspective of the user;
- present the application view inserted into the defined application region of the virtual environment with a reduced depth of the one or more application models that initially extended beyond the boundary of the application region when viewed from the perspective of the user, such that the one or more application models no longer extend beyond the boundary of the application region when viewed from the perspective of the user.

* * * * *